(12) United States Patent
Tamura

(10) Patent No.: US 7,046,873 B2
(45) Date of Patent: May 16, 2006

(54) OPTICAL SWITCH DEVICE

(75) Inventor: Masaya Tamura, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/459,552

(22) Filed: Jun. 12, 2003

(65) Prior Publication Data

US 2004/0052447 A1 Mar. 18, 2004

(30) Foreign Application Priority Data

Jul. 30, 2002 (JP) .................................. 2002-221600

(51) Int. Cl.
*G02B 6/35* (2006.01)

(52) U.S. Cl. ........................ 385/19; 385/18; 385/137

(58) Field of Classification Search ............ 385/16–23, 385/136–137, 83–84
See application file for complete search history.

(56) References Cited

U.S. PATENT DOCUMENTS 6,315,462 B1   11/2001  Anthamatten
6,574,412 B1 *  6/2003  Brun et al. ................. 385/137

FOREIGN PATENT DOCUMENTS

| JP | 06-315462 | 11/1994 |
| JP | 07-198995 | 8/1995 |
| JP | 08-005869 | 1/1996 |
| JP | 09-159869 | 6/1997 |

OTHER PUBLICATIONS

Liu Jing–quan et al., "A Novel Device of Passive and Fixed Alignment of Optical Fiber Using SU–8 Photoresist" SPIE Proceedings vol. 4928, MEMS/MOEMS Technologies and Applications, pp. 1–5, 2002.

Strandman, C. and R. Gupta, "Modelling of Fibre Holding Elements in Silicon" J. Micromech. Microeng., vol. 9, pp. 277–282, 1999.

Christenson, Todd "X–Ray–Based Fabrication" The MEMS Handbook, CRC Press, Chapter 18, p. 29, 2002.

English Translation of Notification of Reasons for Rejection related to patent application number 2002–221600, dispatch date May 10, 2005.

Notice of the First Office Action issued in the corresponding Chinese Application No. 03152255.6 dated May 13, 2005.

(Continued)

*Primary Examiner*—Akm Enayet Ullah
*Assistant Examiner*—Jerry T. Rahill
(74) *Attorney, Agent, or Firm*—Keating & Bennett, LLP

(57) ABSTRACT

An optical switch device is capable of positioning an optical fiber in substantially perpendicular directions without using an additional member so as to improve the easiness in mounting the optical fiber. While a silicon substrate is bonded on the surface of a glass substrate, on the silicon substrate, a plurality of fiber-mounting grooves for mounting the optical fiber and an actuator including a mirror for switching an optical path between a plurality of the optical fibers. On an internal surface of the fiber-mounting groove, a fiber clamp is constructed for applying an obliquely inclined pushing force to the optical fiber. Thereby, the optical fiber is pushed with the fiber clamp toward the other internal surface as well as toward the glass substrate so as to position the optical fiber.

51 Claims, 29 Drawing Sheets

OTHER PUBLICATIONS

Liu Jing–Quan et al: "A Novel Device of Passive and Fixed Alignment of Optical Fiber Using SU–8 Photoresist"; Mems/Moems Technologies and Applications: Shanghai, China; 17–18 Oct. 2002, vol. 4928; pp. 1–5.

Carola Stradman and Ram Gupta: "Modelling of Fibre Holding Elements in Silicon"; Journal of Micromechanics and Microengineering; Sep. 1999; IOP Publishing; UK; vol. 9; No. 3; pp. 277–282.

Mohamed Gad–El–Hak:"The Mems Handbook"; CRC Press; Figure 18.38.

Carolina Stradman and Ylva Backlund: "Bulk Silicon Holding Structures for Mounting of Optical Fibers in V–Grooves"; Journal of Microelectromechanical systems; IEEE Inc.; New York US; vol. 6; No. 1; Mar. 1, 1997; pp. 35–40.

J–S Liu and T J Lu: "Optimal Design of Optical Fibre–Holding Microlips with Metamorphic Development"; Journal of Micromechanics and Microengineering; May 2001, IOP Publishing; UK; vol. 11; No. 3; pp. 195–201.

* cited by examiner

OPTICAL SWITCH DEVICE

BACKGROUND OF THE INVENTION

1. Field of the Invention

The present invention relates to an optical switch device for switching an optical path connected between a plurality of fibers using a mirror, for example.

2. Description of the Related Art

An optical switch device is generally known, which includes a first substrate including a silicon substrate and a second substrate including another silicon substrate and arranged to abut the first substrate. The second substrate is provided with four fiber-mounting grooves arranged 90° apart each other so as to face the first substrate and extend radially and an electrostatic actuator having a mirror entering into and withdrawing from between two respective optical fibers opposing each other for switching an optical path between the two optical fibers (U.S. Pat. No. 6,315,462, for example).

In such a conventional technique, if the electrostatic actuator is stopped so that the mirror enters between the fibers, light rays emitted from the optical fibers are reflected by the mirror in perpendicular directions so that the respective two optical fibers arranged perpendicular to each other are connected together. On the other hand, if the electrostatic actuator is driven so that the mirror withdraws from between the optical fibers, light rays emitted from the optical fibers proceed straight so that the respective two optical fibers opposing each other are connected together.

Incidentally, in the conventional technique described above, in order to align optical axes of optical fibers, one of two internal surfaces opposing each other in the fiber-mounting groove is provided with an elastic bracket for pushing the optical fiber toward the other surface. However, although the optical fiber can be positioned by this elastic bracket in the horizontal direction of the second substrate, it is not positioned in the vertical direction. Therefore, in order to align optical axes of optical fibers, it is necessary to push the optical fiber toward the first substrate using an additional member, so that difficulties in mounting the optical fiber have been encountered.

SUMMARY OF THE INVENTION

In order to solve the problems described above, preferred embodiments of the present invention provide an optical switch device that is capable of positioning an optical fiber in two perpendicular directions so as to improve the ease of mounting the optical fiber.

In order to solve the problems described above, an optical switch device according to a preferred embodiment of the present invention includes a first substrate, a second substrate arranged to abut the first substrate and having a plurality of fiber-mounting grooves disposed thereon adjacent to the first substrate, a plurality of optical fibers arranged in each of the plurality of fiber-mounting grooves of the second substrate and opposing each other at an interval, and an actuator for switching an optical path between the optical fibers by proceeding to and retracting from between the plurality of optical fibers arranged on the second substrate, wherein the second substrate is provided with a fiber clamp for pushing the optical fiber toward one of two internal surfaces opposing each other of the fiber-mounting groove as well as toward the first substrate.

By constructing the optical switch device in such a manner, when the optical fiber is inserted into the fiber-mounting groove, using the fiber clamp, the optical fiber can be pushed toward one of two internal surfaces in the fiber-mounting groove as well as toward the first substrate. Therefore, without using an additional member, by only inserting the optical fiber into the fiber-mounting groove, the optical fiber can be positioned in two perpendicular directions, enabling a significantly improved and very easy mounting of the optical fiber.

Preferably, the fiber clamp includes a spring unit with the rear anchor attached to one internal surface of the fiber-mounting groove and with the end extremity movable in width directions of the fiber-mounting groove and a pushing unit arranged adjacent to the end extremity of the spring unit for obliquely pushing the optical fiber toward the other internal surface as well as toward the first substrate.

Thereby, the pushing unit is elastically brought into contact with the optical fiber by the elastic properties of the spring unit while being capable of positioning the optical fiber by obliquely pushing the optical fiber toward the other internal surface as well as toward the first substrate.

Preferably, the pushing unit is provided with an inclined plane formed thereon that is inclined in the thickness direction of the second substrate so as to be brought into surface contact with the optical fiber.

Since the inclined plane is brought into surface contact with the optical fiber, an oblique pushing force inclined in the thickness direction of the second substrate can be produced in comparison with the case where corners of the pushing unit are brought into line contact with the optical fiber, so that the pushing force can be stably applied to the optical fiber in an oblique direction. Also, if a silicon substrate made of monocrystalline silicon is used as the second substrate, by performing anisotropic etching on the silicon substrate, the pushing unit having the inclined plane can be manufactured. Therefore, in comparison with the case where the reactive ion etching is used, the machining time for the pushing unit can be reduced.

Preferably, the actuator includes an arm disposed adjacent to the surface of the second substrate and extending over between the plurality of optical fibers, a mirror disposed in the middle of the arm in the longitudinal direction and extending toward the first substrate, and two driving units disposed adjacent to opposite ends of the arm for displacing the arm in the longitudinal direction thereof so as to drive the mirror to proceed to and retract from the middle of the optical path, and wherein the fiber clamp is constructed together with the arm of the actuator so as to position the fiber clamp adjacent to the surface of the second substrate.

Thereby, using the two driving units, the mirror can be driven to proceed to and retract from the middle of the optical path, so that the optical path can be switched using the mirror. Since the mirror is disposed in the middle of the arm, the driving units such as electrostatic actuators can be provided in two locations adjacent to opposite ends of the arm, while if the mirror is provided at the end extremity of the arm, the driving unit can be arranged only in one location that is the rear anchor of the arm. Therefore, the mirror is driven to proceed and retract using the two driving units, so that the voltage applied to each of the driving units can be reduced, enabling the operability to be improved in comparison with the case where one driving unit is used. Furthermore, since the fiber clamp is constructed together with the arm of the actuator, the machining time by the reactive ion etching can be reduced in comparison with the case where the actuator is machined separately from the fiber clamp.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
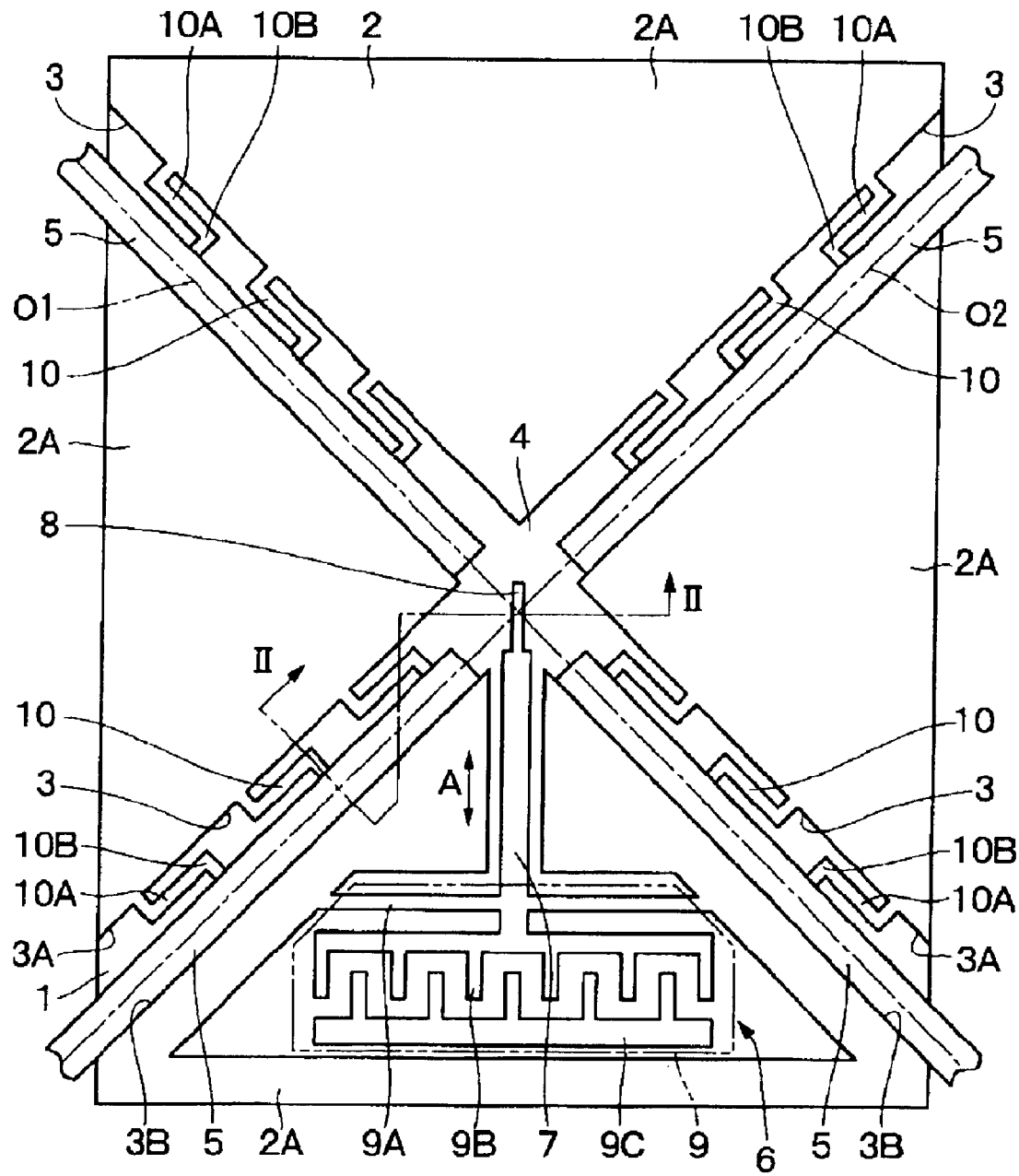
FIG. 1 is a plan view of an optical switch device according to a first preferred embodiment of the present invention shown in a state that a glass substrate for covering is removed.
Figure 2:
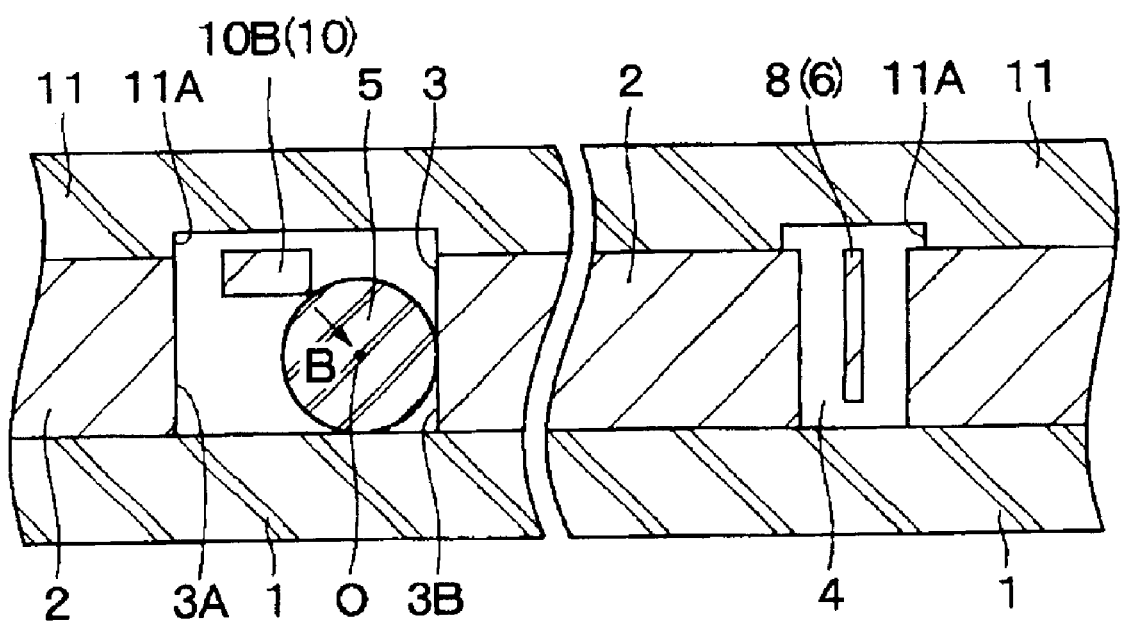
FIG. 2 is a sectional view of a fiber-mounting groove, a fiber clamp, a mirror, and so forth viewed in the arrow II—II direction in FIG. 1.
Figure 3:
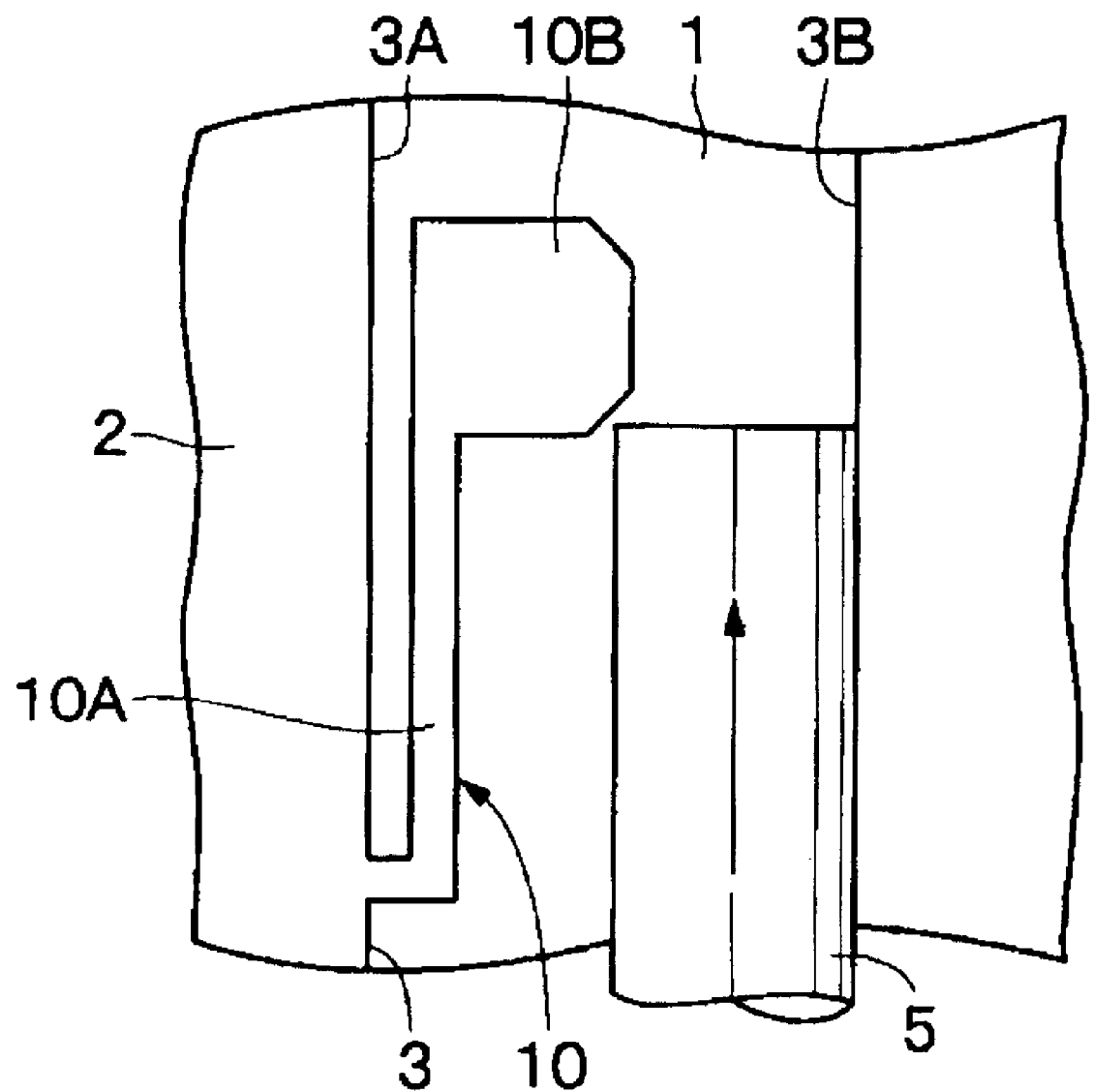
FIG. 3 is an enlarged plan view of essential parts of the fiber-mounting groove, the fiber clamp, and so forth shown in FIG. 1.
Figure 4:
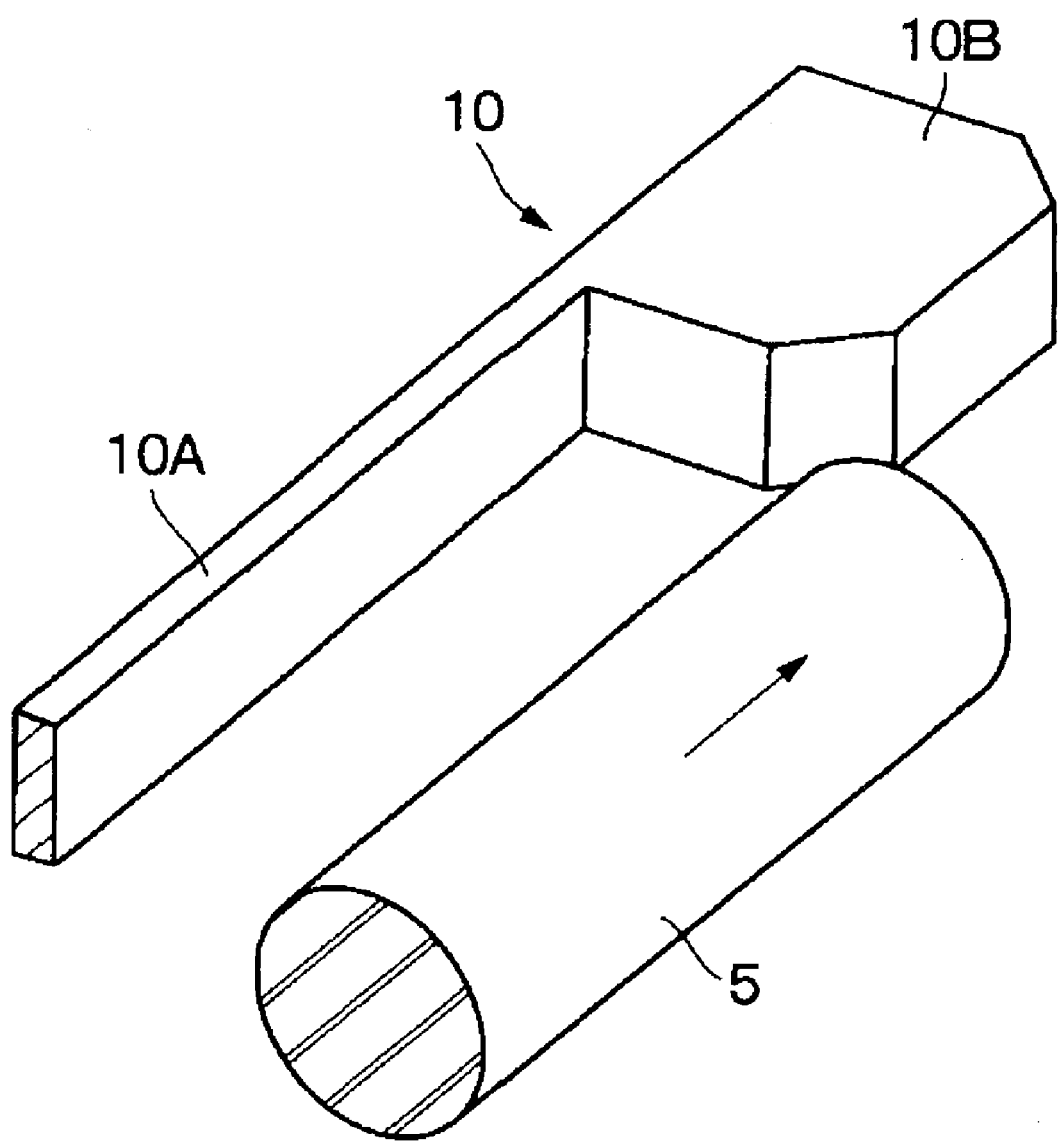
FIG. 4 is an enlarged perspective view of essential parts of the fiber clamp and an optical fiber shown in FIG. 3.

An optical switch device according to preferred embodiments of the present invention will be described below in detail with reference to the attached drawings.

First, FIGS. 1 to 9 show a first preferred embodiment according to the present invention, wherein a glass substrate 1 is made from a glass material so as to have a substantially rectangular plate-shape as a first substrate. The glass substrate 1 has a substantially flat surface, on which fiber-mounting grooves 3 and an actuator 6, etc. are to be formed as will be described later.

A silicon substrate 2 is arranged so as to abut a surface of the glass substrate 1 as a second substrate, and is made from a monocrystalline or polycrystalline silicon material so as to have a substantially rectangular plate-shape with substantially the same size as that of the glass substrate 1. The silicon substrate 2 is bonded on the surface of the glass substrate 1 with an anode coupling method, for example.

Four fiber-mounting grooves 3 in total are formed in between the glass substrate 1 and the silicon substrate 2, and are radially (crosswise) arranged at about 90° apart from each other. The fiber-mounting grooves 3 are linearly arranged along two optical paths O1 and O2 intersecting with (substantially perpendicular to) each other, and respective two grooves 3 are arranged sandwiching the central intersection 4 of the optical paths O1 and O2. The fiber-mounting grooves 3 are formed so as to penetrate the silicon substrate 2 in the thickness direction and separate the silicon substrate 2 into four substantially triangular islands 2A, while internal surfaces 3A and 3B opposing each other are formed inside the groove 3 and the glass substrate 1 is exposed on the bottom surface of the groove 3.

Four optical fibers 5 attached to the fiber-mounting grooves 3 are arranged along the optical paths O1 and O2 in total, two for each of them. The respective two optical fibers 5 arranged along each of the optical paths O1 and O2 are opposed to each other with a space therebetween sandwiching the central intersection 4.

An actuator 6 is arranged on the island 2A of the silicon substrate 2 sandwiched by the two fiber-mounting grooves 3, and generally includes an arm 7 linearly extending from the central intersection 4 of the optical paths O1 and O2 toward the island 2A, a thin-width mirror 8 formed at the end extremity of the arm 7 and being capable of entering to and withdrawing from the central intersection 4, and a driving unit 9 disposed at the rear anchor of the arm 7 for displacing the arm 7 in the longitudinal direction (arrow A direction) of the arm 7. On the surface of the mirror 8, a thin film (not shown) made from a conductive metallic material is formed by as sputtering and vapor deposition, for example, and then it is mirror-finished.

The driving unit 9 generally includes a support beam 9A linearly extending from both sides of the arm 7 in directions that are substantially perpendicular to the longitudinal direction of the arm for supporting the arm 7 movably in the arrow A directions, a movable interdigital electrode 9B disposed in the rear anchor of the arm 7 and moving together with the arm 7, and a fixed interdigital electrode 9C fixed to the glass substrate 1 so as to mesh with the movable interdigital electrode 9B. The arm 7, the mirror 8, the support beam 9A, and the movable interdigital electrode 9B are supported by the support beam 9A in a spaced and floating state from the glass substrate 1. By applying a voltage to between the two interdigital electrodes 9B and 9C, an electrostatic attracting force is produced, so that the arm 7, the mirror 8, and the movable interdigital electrode 9B are displaced as a whole in the directions of arrow A.

A fiber clamp 10 provided inside the fiber-mounting groove 3 includes a spring unit 10A with the rear anchor attached to one internal surface 3A of the fiber-mounting groove 3 and extending along the fiber-mounting groove 3 as a cantilever and a pushing unit 10B arranged adjacent to the end extremity of the spring unit 10A so as to protrude toward the other internal surface 3B. The fiber clamp 10 is arranged to be located closer to the surface of the silicon substrate 2 (opposite to the glass substrate 1) than the axial center O (core) of an optical fiber 5 to be inserted into the fiber-mounting groove 3. The pushing unit 10B has a substantially rectangular shape and protrudes from the end extremity of the spring unit 10A while corners thereof are preferably chamfered for facilitating the optical fiber 5 to be inserted.

The end extremity of the spring unit 10A becomes movable in width directions of the fiber-mounting groove 3, so that the corners of the pushing unit 10B with a substantially rectangular section are elastically brought into contact with the optical fiber 5 closer to the one internal surface 3A than the axial center O as well as remote from the glass substrate 1 with the axial center O therebetween (adjacent to the surface of the silicon substrate 2). Thereby, the fiber clamp 10 applies a pushing force to the optical fiber 5 in the arrow B direction, which is inclined relative to the thickness direction of the silicon substrate 2, so as to push the optical fiber 5 toward the other internal surface 3B and the glass substrate 1.

A glass substrate 11 provided on the surface of the silicon substrate 2 as a cover substrate and having substantially the same rectangular shape as that of the glass substrate 1 is bonded on the surface of the silicon substrate 2 with an anode coupling method. On the bottom surface of the glass substrate 11, shallow grooves 11A are provided at positions covering the fiber-mounting groove 3 and the actuator 6. The shallow grooves 11A have clearances between the glass substrate 11 and the actuator 6 and between the glass substrate 11 and the fiber clamp 10. The actuator 6 and the fiber clamp 10 are thereby prevented from contacting the glass substrate 11, compensating the moving operation of these members.

In addition, the glass substrate 11 is not necessarily needed as a cover substrate, and it may be omitted.

The optical switch device according to the present preferred embodiment preferably has the structure described above, and now a manufacturing method thereof will be described with reference to FIGS. 5 to 9.

Figure 5:
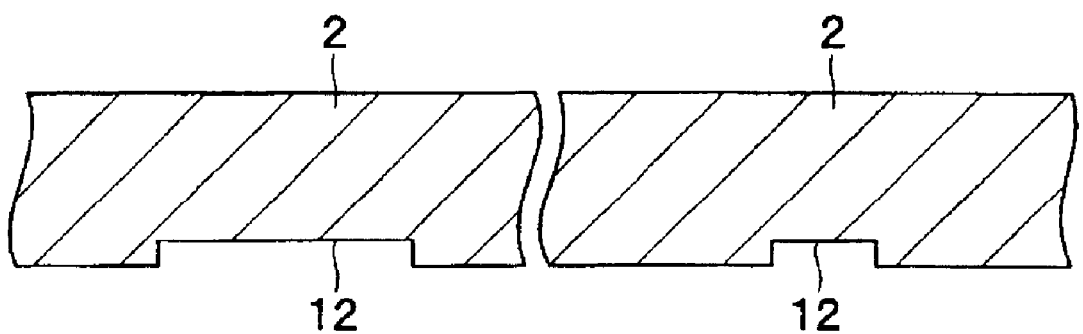
FIG. 5 is a sectional view showing a state that a shallow groove is formed on a silicon substrate at the same position as that in FIG. 2.

First, as shown in FIG. 5, on portions of the bottom surface of the silicon substrate 2 corresponding to positions at which the fiber-mounting grooves 3, the central intersection 4, the actuator 6, and so forth (see FIG. 2) are formed, reactive ion etching (DEEP RIE) is performed so as to form shallow grooves 12.

Figure 6:
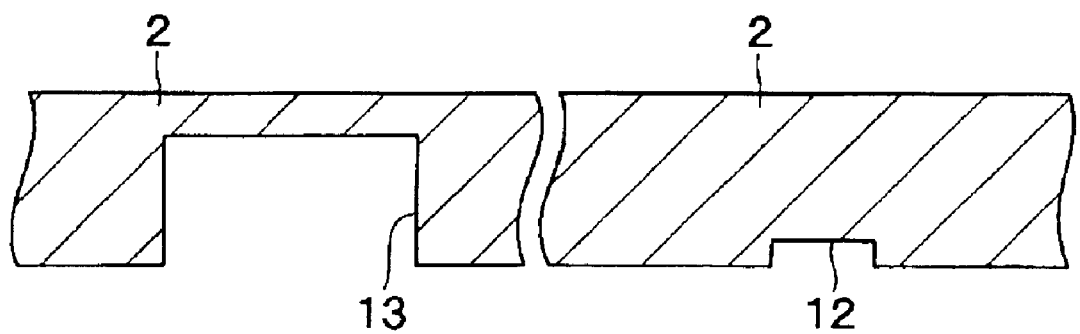
FIG. 6 is a sectional view showing a state that a preliminary fiber-mounting groove is formed on the silicon substrate shown in FIG. 5.
Figure 7:
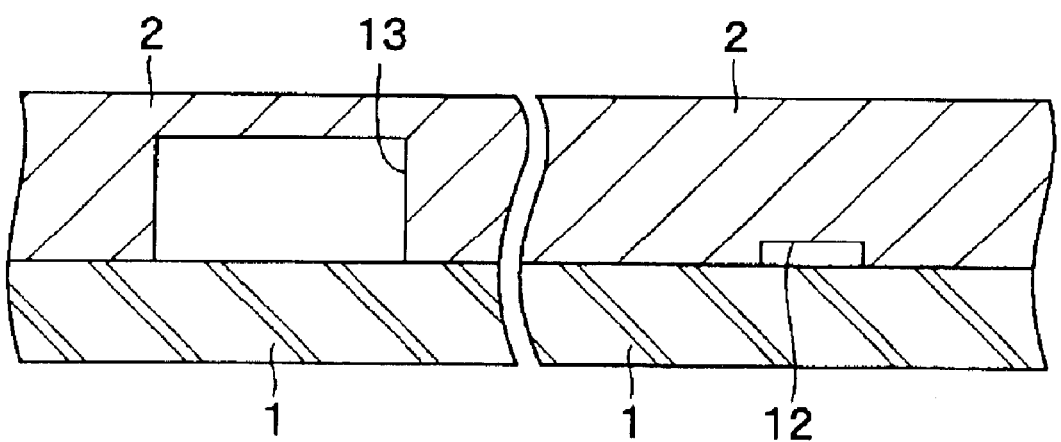
FIG. 7 is a sectional view showing a state that a supporting glass substrate is bonded on the bottom surface of the silicon substrate shown in FIG. 6.

Next, as shown in FIG. 6, on the portions corresponding to positions at which the fiber-mounting grooves 3 are formed, the reactive ion etching is again performed from the bottom surface of the silicon substrate 2 so as to form preliminary fiber-mounting grooves 13, in which a thickness corresponding to the fiber clamp 10 is left adjacent to the surface of the silicon substrate 2. Then, as shown in FIG. 7, on the bottom surface of the silicon substrate 2, the glass substrate 1 is bonded by anode coupling as a first substrate.

Figure 8:
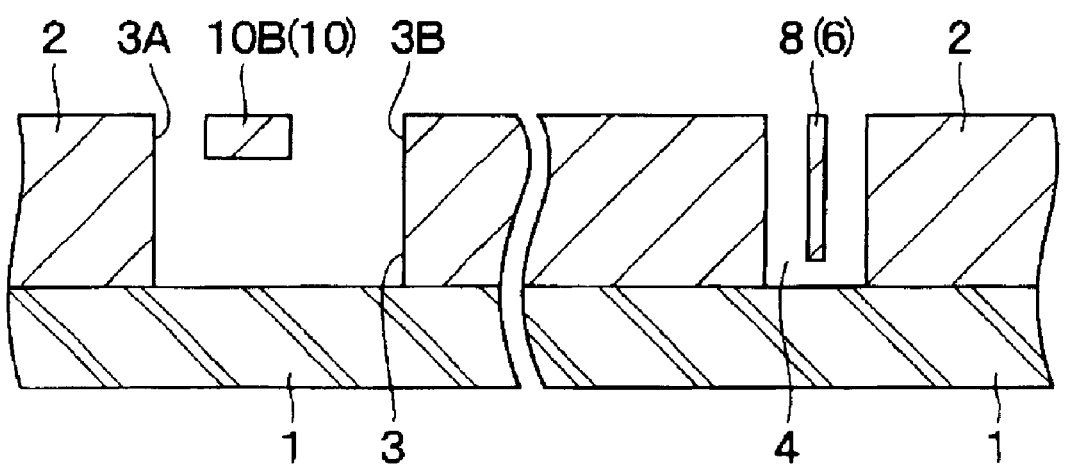
FIG. 8 is a sectional view showing a state that reactive ion etching is performed from the surface of the silicon substrate shown in FIG. 7 so as to form the fiber clamp, the mirror, and so forth.

Then, as shown in FIG. 8, on the portions corresponding to the shallow grooves 12 of the silicon substrate 2, the reactive ion etching is performed from the surface of the silicon substrate 2 so as to penetrate the silicon substrate 2 and form the actuator 6 such as the mirror 8 while forming the fiber-mounting grooves 3 and the fiber clamp 10 together. In this state, on the surface of the mirror 8, a thin film (not shown) made of a conductive metallic material is formed by means such as sputtering and vapor deposition, for example, and then it is mirror-finished.

Figure 9:
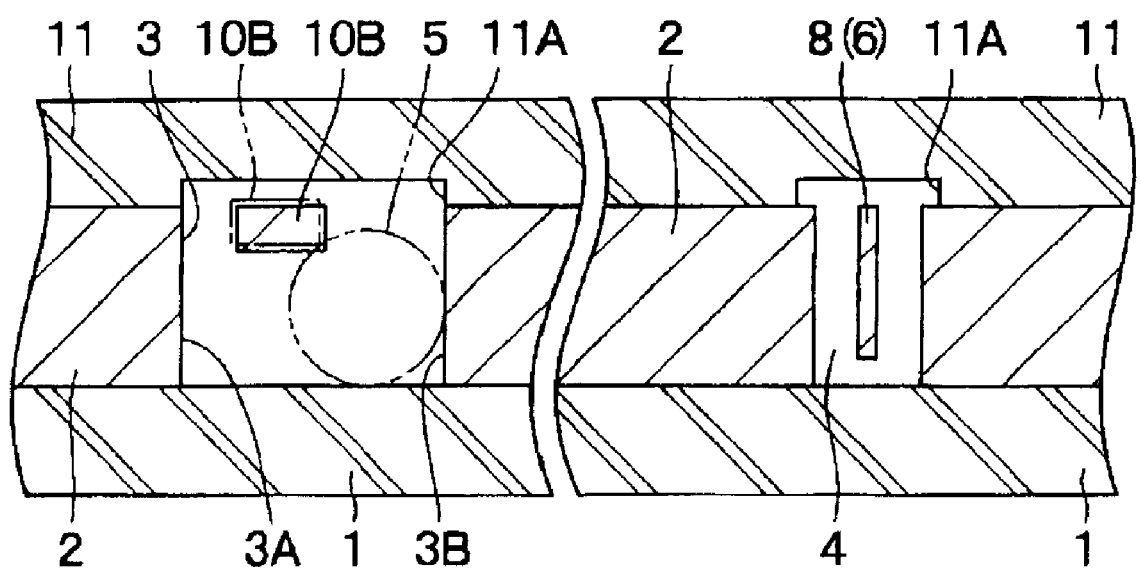
FIG. 9 is a sectional view showing a state that the glass substrate for covering is bonded on the surface of the silicon substrate shown in FIG. 8.
Figure 10:
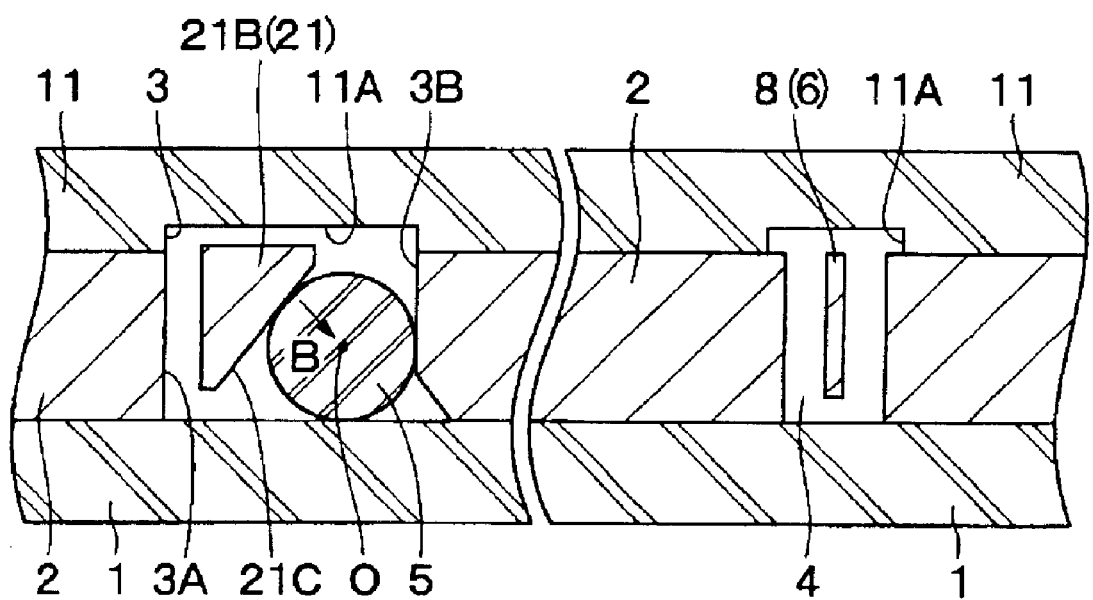
FIG. 10 is a sectional view of a fiber-mounting groove, a fiber clamp, a mirror, and so forth according to a second preferred embodiment at the same position as that in FIG. 2.
Figure 11:
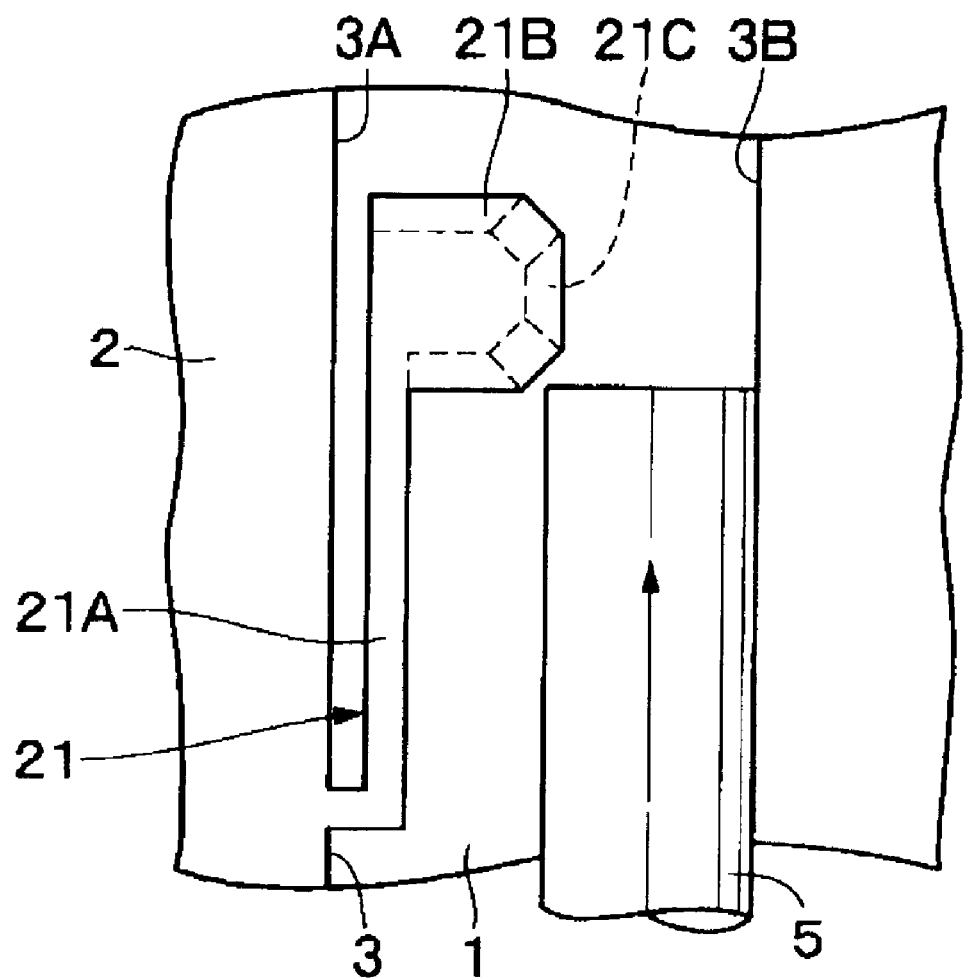
FIG. 11 is an enlarged plan view of essential parts of the fiber-mounting groove, the fiber clamp, and so forth.
Figure 12:
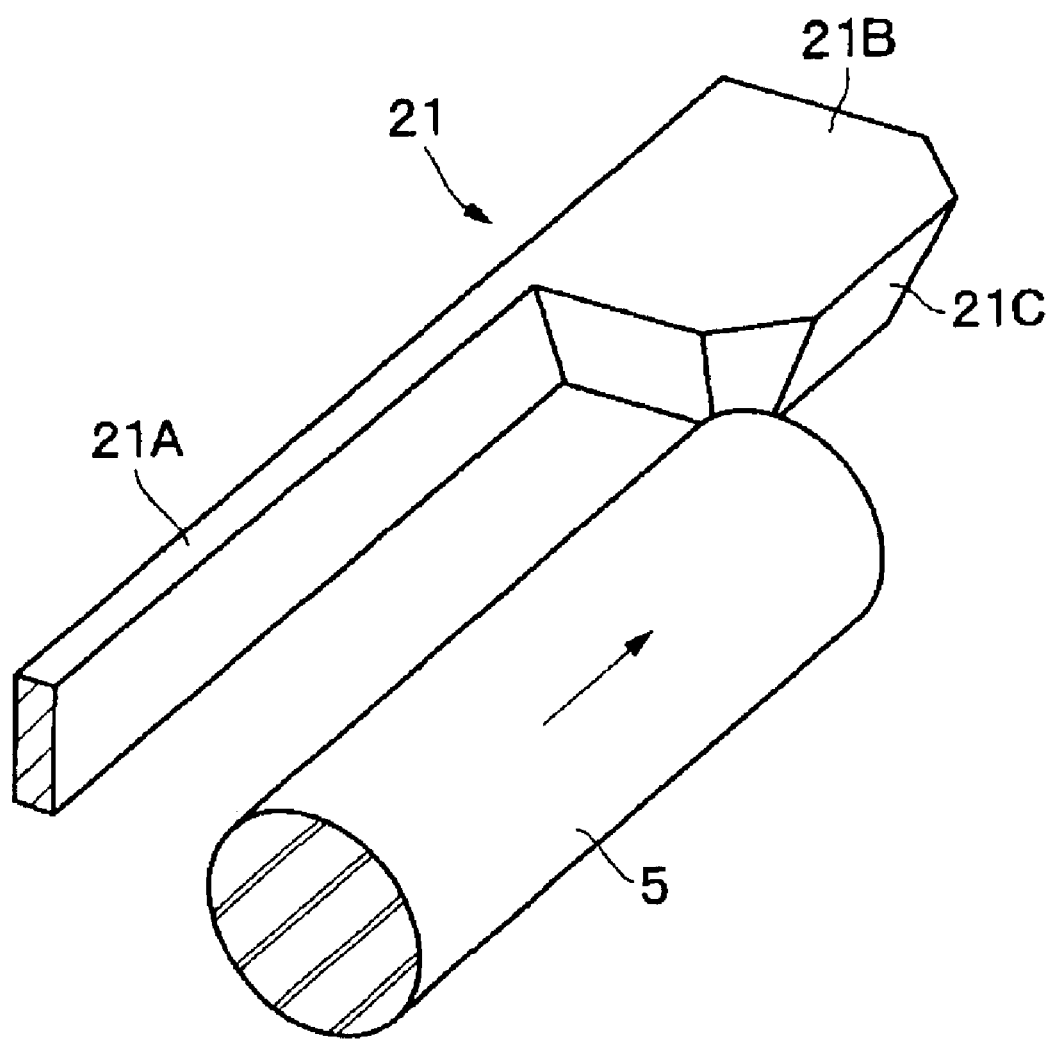
FIG. 12 is an enlarged perspective view of essential parts of the fiber clamp and the optical fiber shown in FIG. 3.

Finally, as shown in FIG. 9, on the surface of the silicon substrate 2, the glass substrate 11 having the shallow grooves 11A formed thereon in advance is bonded as a cover substrate. Then, after the optical fibers 5 are inserted toward and along the fiber-mounting grooves 3 from the external periphery of the silicon substrate 2, the optical fibers 5 are fixed with an adhesive so as to complete the optical switch device.

In addition, according to the present preferred embodiment, the shallow grooves 12 are formed on the silicon substrate 2 in advance. Alternatively, shallow grooves may be formed on the glass substrate 1 instead of the shallow grooves 12.

The optical switch device according to the present preferred embodiment is manufactured by the method described above, and now switching operation thereof will be described.

First, if a voltage is not applied between the movable interdigital electrode 9B and the fixed interdigital electrode 9C, owing to an elastic force of the support beam 9A, the mirror 8 enters the central intersection 4 to be located there. Therefore, light emitted from one pair of two optical fibers 5 each, which are arranged along the optical paths O1 and O2, respectively, is reflected on the mirror 8 so as to enter the other pair of two optical fibers 5 each, which are arranged along the perpendicular optical paths O2 and O1, respectively, so that optical communications are performed therebetween.

On the other hand, if a voltage is applied between the movable interdigital electrode 9B and the fixed interdigital electrode 9C, an electrostatic attracting force is produced, so that the mirror 8 is retracted from the central intersection 4 against the elastic force of the support beam 9A. Therefore, light emitted from one pair of two optical fibers 5 each, which are arranged along the optical paths O1 and O2, respectively, is entered into the other pair of two optical fibers 5 each, which are arranged along the optical paths O1 and O2, respectively, so that optical communications are performed therebetween. As a result, based on the presence of the voltage applied between the electrodes 9B and 9C, the optical paths O1 and O2 can be switched and connected.

Whereas, according to the present preferred embodiment, the fiber clamp 10 is provided on one internal surface 3A of the fiber-mounting groove 3, so that the optical fiber 5 can be pushed toward the other internal surface 3B as well as toward the glass substrate 1 using the fiber clamp 10. Therefore, by only inserting the optical fiber 5 into the fiber-mounting groove 3 without using an additional member, the optical fiber 5 can be positioned in two directions which are the width direction (horizontal direction) of the fiber-mounting groove 3 and the thickness direction (vertical direction) of the silicon substrate 2, thereby significantly improving the ease of mounting of the optical fiber 5.

Since the fiber clamp 10 includes the spring unit 10A with the rear anchor attached to one surface 3A of the fiber-mounting groove 3 and with the end extremity movable in width directions of the fiber-mounting groove 3 and the pushing unit 10B arranged adjacent to the end extremity of the spring unit 10A which is brought into contact with the optical fiber 5 closer to the one internal surface 3A than the axial center O as well as remote from the glass substrate 1 with the axial center O therebetween, a pushing force can be applied to the optical fiber 5 in a direction that is inclined relative to the thickness direction of the silicon substrate 2. Therefore, with the pushing unit 10B of the fiber clamp 10, the optical fiber 5 can be obliquely pushed toward the other internal surface 3B of the fiber and the glass substrate 1.

Since the fiber clamp 10 is provided in the silicon substrate 2, the fiber clamp 10 can be built up using a micromachining technique, such as the reactive ion etching, integrally with the actuator 6 and the like and with high precision. Therefore, in comparison with the case where the fiber clamp 10 is formed in the other member, the accuracy in positioning the optical fiber 5 is greatly improved.

Next, FIGS. 10 to 17 show a second preferred embodiment according to the present invention. One of the unique features of this preferred embodiment is that the pushing unit of the fiber clamp is obliquely inclined in the thickness direction of the silicon substrate and has an inclined plane surface-contacting on the optical fiber. In addition, according to the present preferred embodiment, like reference characters designate like components common to the first preferred embodiment described above, and the description thereof is omitted.

A fiber clamp 21 according to the present preferred embodiment that is provided inside the fiber-mounting groove 3, in substantially the same way as with the fiber clamp 10, includes a spring unit 21A with the rear anchor attached to one internal surface 3A of the fiber-mounting groove 3 and extending along the fiber-mounting groove 3 as a cantilever and a pushing unit 21B arranged adjacent to the end extremity of the spring unit 21A so as to protrude toward the other internal surface 3B. The pushing unit 21B has a substantially rectangular shape and protrudes from the end extremity of the spring unit 21A while corners thereof are chamfered for facilitating the optical fiber 5 to be inserted. Furthermore, the pushing unit 21B has an inclined plane 21C obliquely inclined in the thickness direction of the silicon substrate 2 as well as gradually separating from the other internal surface 3B.

The end extremity of the spring unit 21A becomes movable in width directions of the fiber-mounting groove 3, and the inclined plane 21C of the pushing unit 21B is elastically brought into surface-contact with the optical fiber 5 closer to the one internal surface 3A than the axial center O as well as remote from the glass substrate 1 with the axial center O therebetween (adjacent to the surface of the silicon substrate 2). Thereby, the fiber clamp 21 applies a pushing force to the optical fiber 5 in the arrow B direction, which is inclined relative to the thickness direction of the silicon substrate 2, so as to push the optical fiber 5 toward the other internal surface 3B and the glass substrate 1.

The optical switch device according to the present preferred embodiment has the structure described above, and now a manufacturing method thereof will be described with reference to FIGS. 13 to 17.

Figure 13:
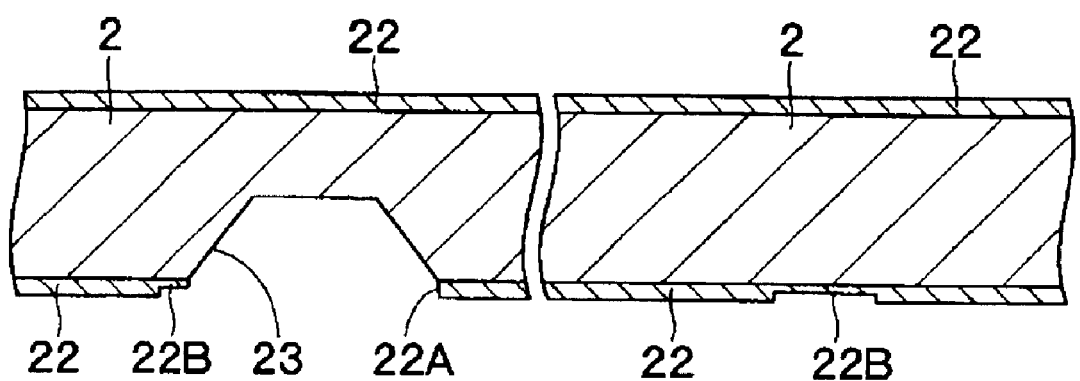
FIG. 13 is a sectional view at the same position as that in FIG. 10, showing a state that anisotropic etching is performed from the bottom surface of the silicon substrate so as to form a preliminary inclined groove.

First, as shown in FIG. 13, on the top and the bottom surface of the silicon substrate 2, oxide films 22 are formed as masks. The oxide film 22 on the bottom surface is provided with openings 22A formed on portions corresponding to positions at which the fiber-mounting grooves 3 are formed, and thin film portions 22B formed at the vicinities of the openings 22A and on portions corresponding to positions at which the central intersection 4, the actuator 6, and so forth (see FIG. 10) are formed. Then, in this state, anisotropic etching is performed for a predetermined period of time from the bottom surface of the silicon substrate 2 and through the openings 22A so as to form tapered preliminary inclined grooves 23.

Figure 14:
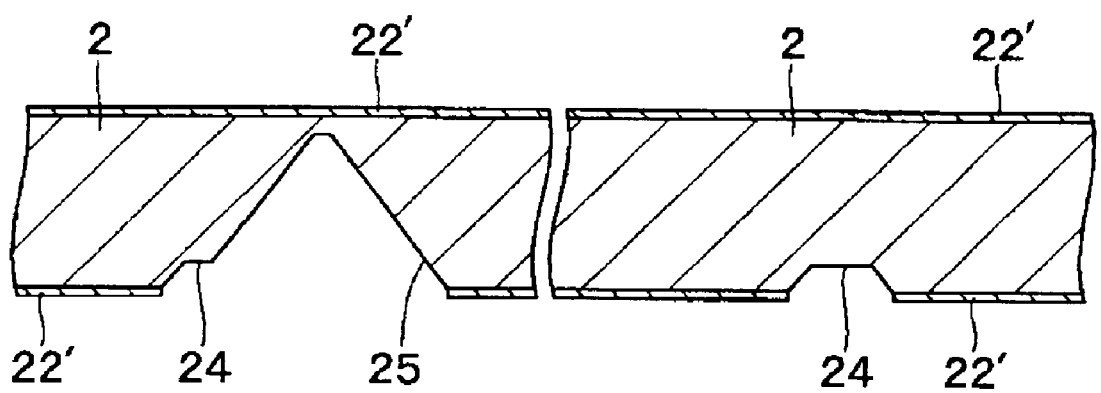
FIG. 14 is a sectional view showing a state that anisotropic etching is further performed on the silicon substrate shown in FIG. 13 so as to form a shallow groove and a final inclined groove.
Figure 15:
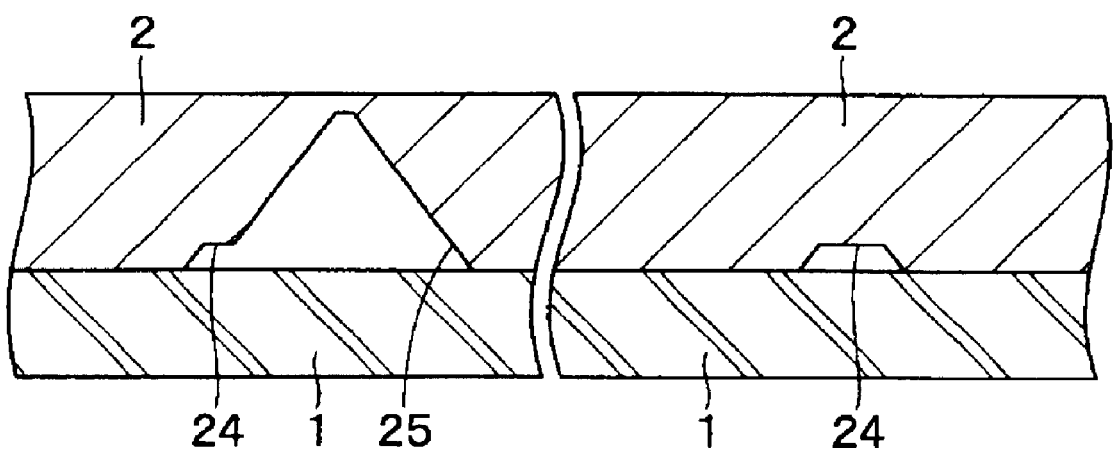
FIG. 15 is a sectional view showing a state that the supporting glass substrate is bonded on the bottom surface of the silicon substrate shown in FIG. 14.

Next, if the entire oxide films 22 are reduced in thickness by etching, etc., as shown in FIG. 14, oxide films 22' with the thin film portions 22B removed are formed. Then, the anisotropic etching is again performed for a predetermined period of time from the bottom surface of the silicon substrate 2 so as to form shallow grooves 24 and final inclined grooves 25. Then, as shown in FIG. 15, in a state that the oxide films are removed, on the bottom surface of the silicon substrate 2, the glass substrate 1 is bonded by anode coupling as a first substrate.

Figure 16:
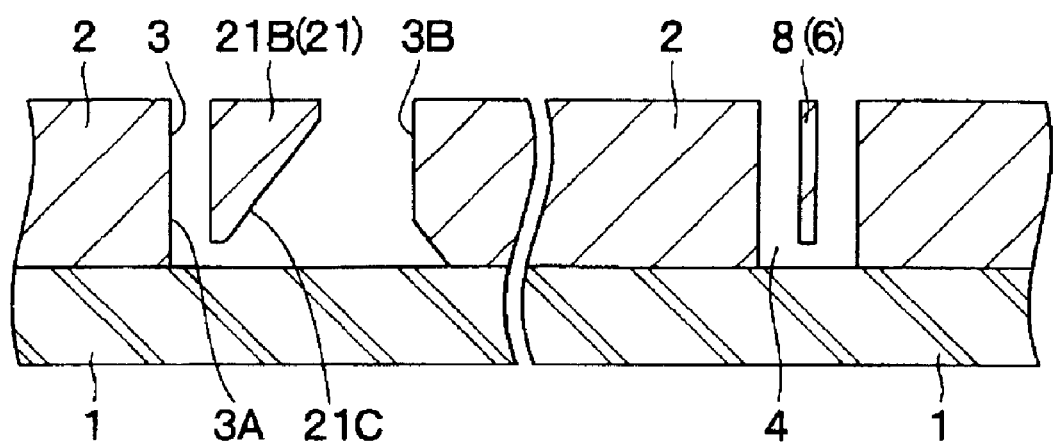
FIG. 16 is a sectional view showing a state that reactive ion etching is performed from the surface of the silicon substrate shown in FIG. 15 so as to form the fiber clamp, the mirror, and so forth.

Then, as shown in FIG. 16, on the portions corresponding to the shallow grooves 24 and the inclined grooves 25, the reactive ion etching is performed from the surface of the silicon substrate 2 so as to penetrate the silicon substrate 2 and form the actuator 6 such as the mirror 8 while forming the fiber-mounting grooves 3 and the fiber clamp 21 together. At this time, on the pushing unit 21B of the fiber clamp 21, the inclined plane 21C is formed by the anisotropic etching. In this state, on the surface of the mirror 8, a thin film (not shown) made of a conductive metallic material is formed by sputtering and vapor deposition, for example, and then it is mirror-finished.

Figure 17:
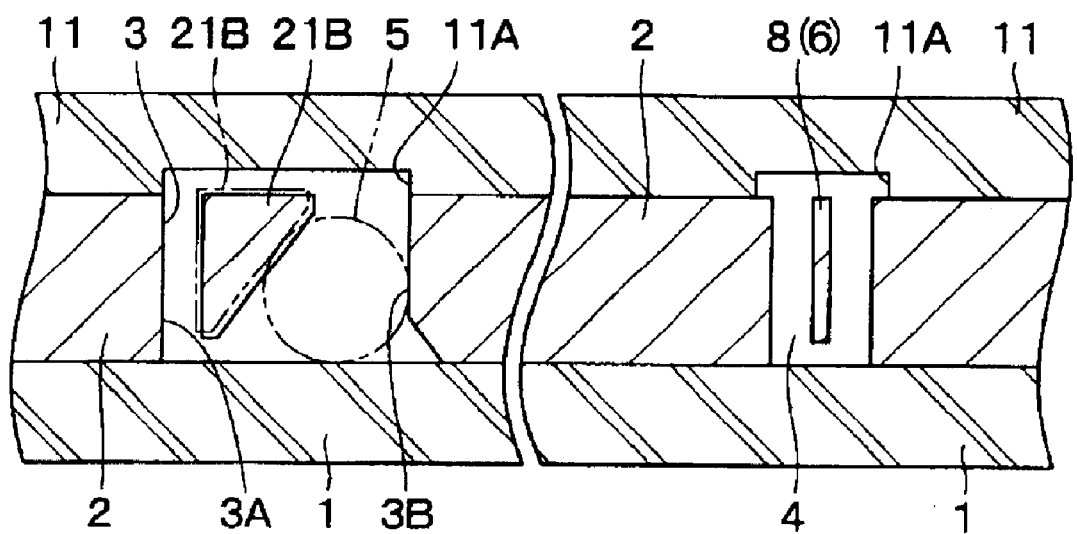
FIG. 17 is a sectional view showing a state that the glass substrate for covering is bonded on the surface of the silicon substrate shown in FIG. 16.
Figure 18:
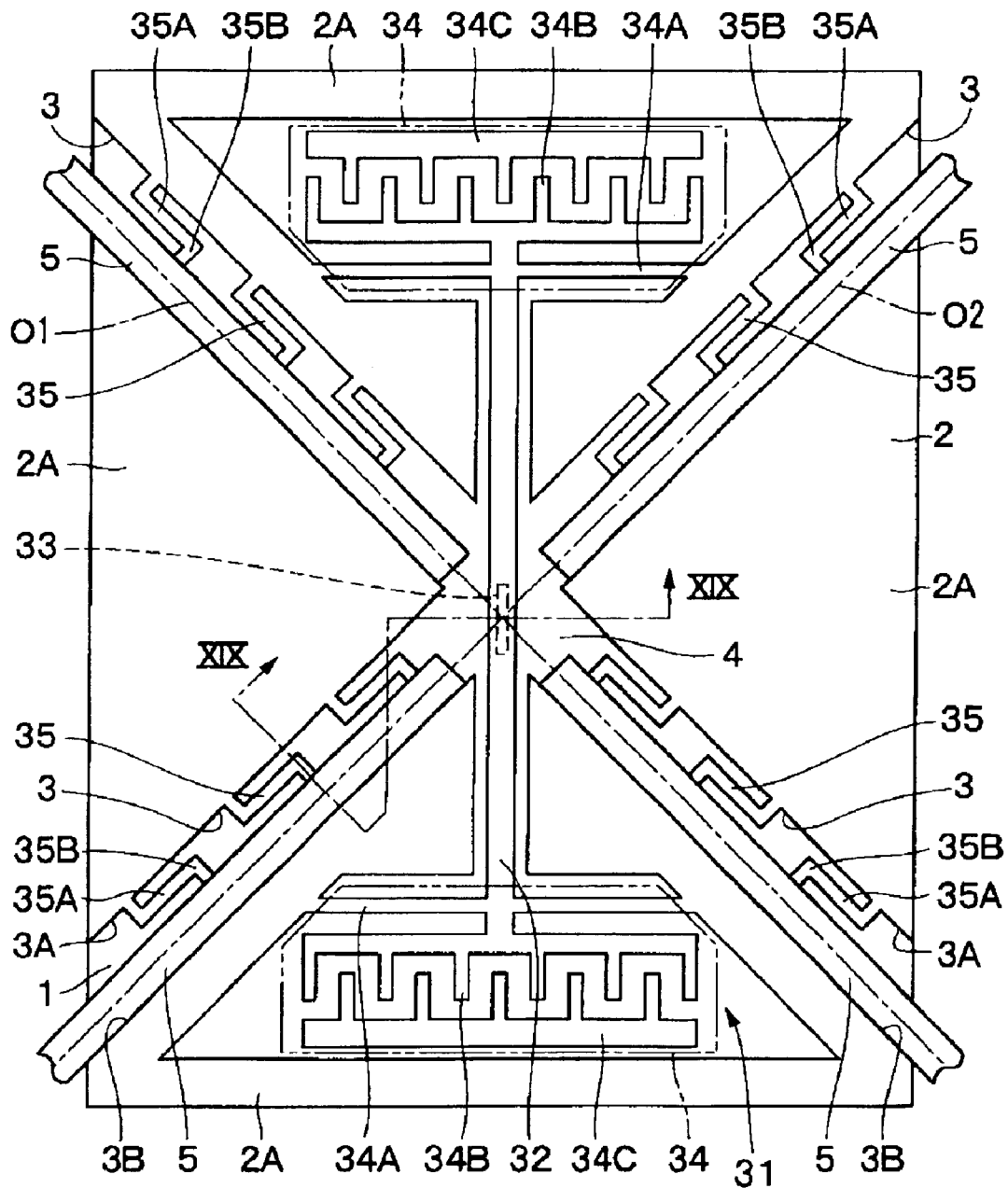
FIG. 18 is a plan view of an optical switch device according to a third preferred embodiment of the present invention shown in a state that a glass substrate for covering is removed.
Figure 19:
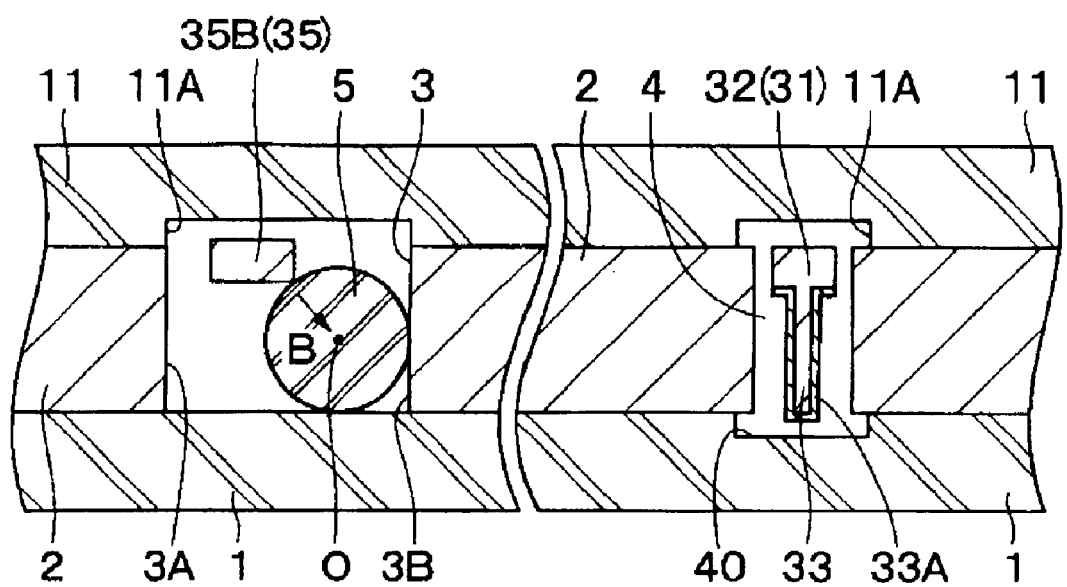
FIG. 19 is a sectional view of a fiber-mounting groove, a fiber clamp, a mirror, and so forth viewed in the arrow XIX—XIX direction in FIG. 18.

Finally, as shown in FIG. 17, on the surface of the silicon substrate 2, the glass substrate 11 having the shallow grooves 11A formed thereon in advance is bonded as a cover substrate. Then, after the optical fibers 5 are inserted into the fiber-mounting grooves 3 from the external periphery of the silicon substrate 2, the optical fibers 5 are fixed with an adhesive so as to complete the optical switch device.

In such a manner, according to the present preferred embodiment having the structure described above, substantially the same advantages as those of the first preferred embodiment described above can also be obtained. Whereas according to the present preferred embodiment, since on the pushing unit 21B of the fiber clamp 21, the inclined plane 21C inclined in the thickness direction of the silicon substrate 2 is formed, the inclined plane 21C is brought into surface-contact with the optical fiber 5. Therefore, in comparison with the first preferred embodiment in which corners of the pushing unit 10B are brought into line-contact with the optical fiber 5, a pushing force obliquely directing relative to the thickness direction of the silicon substrate 2 can be readily produced, so that a pushing force can be stably applied to the optical fiber 5 in an oblique direction (arrow B direction).

By performing the anisotropic etching on the silicon substrate 2 made of monocrystalline silicon, the pushing unit 21B having the inclined plane 21C can be built up, so that including the case where the reactive ion etching is applied, the machining time of the fiber clamp 21 can be reduced, enabling the productivity to be improved.

Next, FIGS. 18 to 26 show a third preferred embodiment according to the present invention. One of the unique features of this preferred embodiment is that the actuator includes an arm disposed on the surface of the silicon substrate and extending over between a plurality of optical fibers, a mirror disposed in the middle of the arm in the longitudinal direction and extending toward the first substrate, and two driving units disposed on both ends of the arm for driving the mirror to proceed to and retract from the middle of the optical path, while forming the fiber clamp together with the arm of the actuator so as to position the fiber clamp on the surface of the silicon substrate. In addition, according to the present preferred embodiment, like reference characters designate like components common to the first preferred embodiment described above, and the description thereof is omitted.

An actuator 31 according to the preferred embodiment is arranged on two islands 2A, which are arranged to oppose each other with the central intersection 4 therebetween. The actuator 31 generally includes an arm 32 linearly extending over the central intersection 4, located between a plurality of optical fibers 5, toward two islands 2A, a mirror 33 with a width smaller than that of the arm 32 and disposed in the middle of the arm 32 in the longitudinal direction so as to be capable of proceeding to and retracting from the optical paths O1 and O2 at the central intersection 4, and two driving units 34 disposed on both ends of the arm 32 for displacing the arm 32 in the longitudinal directions (arrow A directions in FIG. 26). Wherein the mirror 33 is covered with a mirror film 33A made of a thin-film conductive metallic material.

The driving unit 34, in substantially the same way as in the driving unit 9 according to the first preferred embodiment, generally includes a support beam 34A linearly extending from both sides of the arm 32 in directions that are substantially perpendicular to the longitudinal direction of the arm for supporting the arm 32 movably in the directions of arrow A, a movable interdigital electrode 34B disposed adjacent to the end of the arm 32 and moving together with the arm 32, and a fixed interdigital electrode 34C fixed to the glass substrate 1 so as to mesh with the movable interdigital electrode 34B. By applying a voltage with reverse polarity or positive polarity to between the two interdigital electrodes 34B and 34C, an electrostatic attracting or repulsive force is produced, so that the arm 32, the mirror 33, and the movable interdigital electrode 34B are displaced as a whole in the directions of arrow A.

A fiber clamp 35 provided inside the fiber-mounting groove 3, in substantially the same way as in the fiber clamp 10 according to the first preferred embodiment, includes a spring unit 35A with the rear anchor attached to one surface internal surface 3A of the fiber-mounting groove 3 and extending along the fiber-mounting groove 3 as a cantilever and a pushing unit 35B arranged adjacent to the end extremity of the spring unit 35A so as to protrude toward the other internal surface 3B. Wherein the fiber clamp 35 is arranged to be located closer to the surface of the silicon substrate 2 (opposite to the glass substrate 1) than the axial center O (core) of an optical fiber 5 to be inserted into the fiber-mounting groove 3 together with the arm 32 of the actuator 31, while the thickness of the fiber clamp 35 is set up to be substantially the same as that of the arm 32 of the actuator 31. The pushing unit 35B has a substantially rectangular shape and protrudes from the end extremity of the spring unit 35A.

The end extremity of the spring unit 35A becomes movable in width directions of the fiber-mounting groove 3, and the pushing unit 35B elastically pushes the optical fiber 5 toward the other internal surface 3B while sandwiching part of the optical fiber 5 to the glass substrate 1 therebetween. Thereby, the fiber clamp 35 applies a pushing force to the optical fiber 5 in the arrow B direction, which is inclined relative to the thickness direction of the silicon substrate 2, so as to push the optical fiber 5 toward the other internal surface 3B of the fiber-mounting groove 3 and the glass substrate 1.

The optical switch device according to the present preferred embodiment preferably has the structure described above, and now a manufacturing method thereof will be described with reference to FIGS. 20 to 25.

Figure 20:
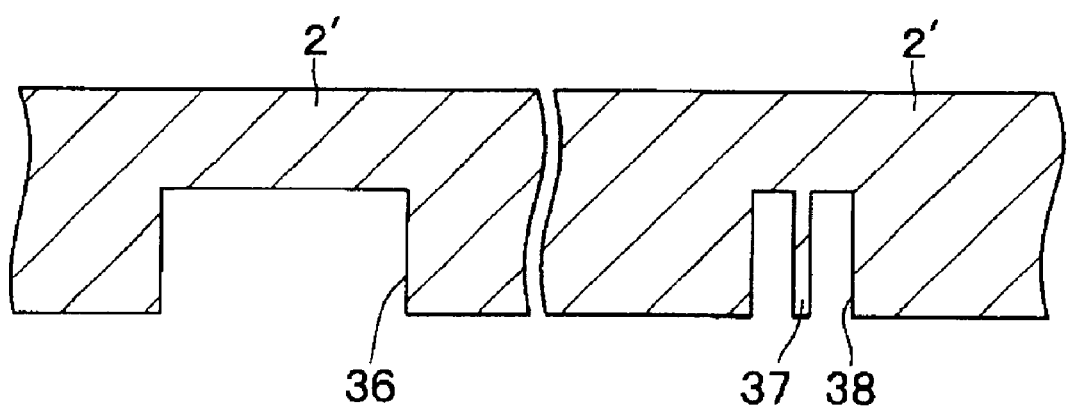
FIG. 20 is a sectional view at the same position as that in FIG. 19, showing a state that reactive ion etching is performed from the bottom surface of the silicon substrate so as to form a preliminary fiber-mounting groove and a preliminary concave groove.

First, as shown in FIG. 20, a silicon substrate 2' with a thickness larger than that of the silicon substrate 2 is prepared. On the bottom surface of the silicon substrate 2', reactive ion etching (DEEP RIE) is performed on portions corresponding to positions, at which the fiber-mounting grooves 3, the central intersection 4, the actuator 6, and so forth (see FIG. 19) are formed, to the middle of the thickness direction of the silicon substrate 2, so as to form preliminary fiber-mounting grooves 36 with substantially the same width as that of the fiber-mounting groove 3 on portions corresponding to positions at which the fiber-mounting grooves 3 are formed while forming a preliminary concave groove 38, having a projection 37 corresponding to the mirror 33 remained, on the portion corresponding to the central intersection 4.

Figure 21:
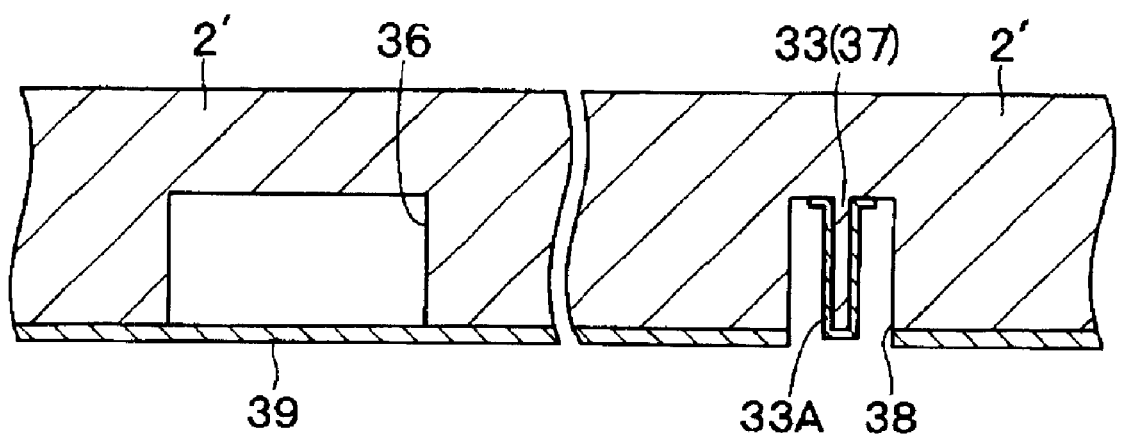
FIG. 21 is a sectional view showing a state that a metal mask is attached on the bottom surface of the silicon substrate shown in FIG. 20 so as to form a mirror film.

Next, as shown in FIG. 21, a metal mask 39 is attached on the bottom surface of the silicon substrate 2' and the surface of the projection 37 is covered with a mirror film 33A made of a conductive metallic thin film by sputtering and vapor deposition so as to form the mirror 33.

Figure 22:
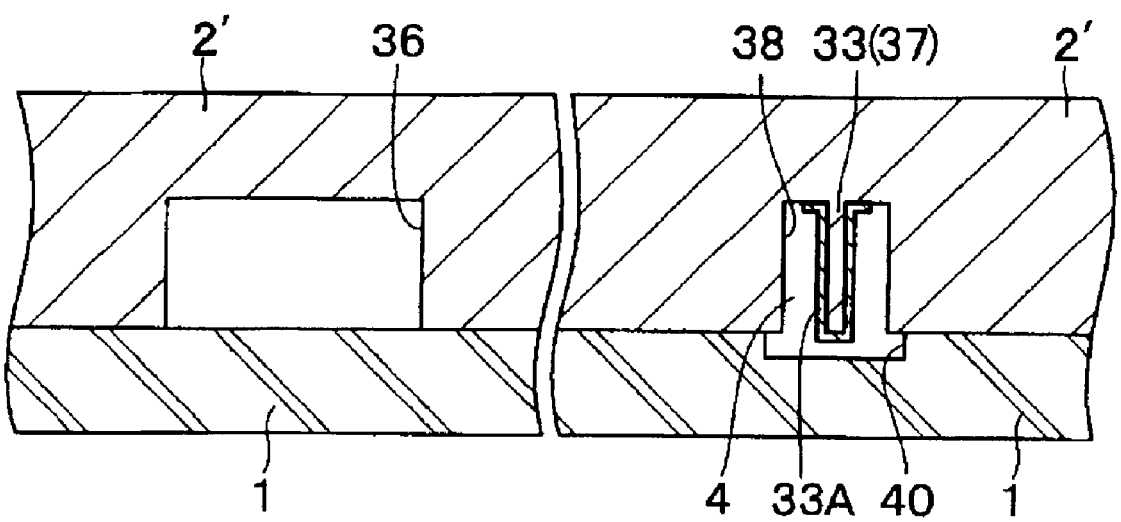
FIG. 22 is a sectional view showing a state that the supporting glass substrate is bonded on the bottom surface of the silicon substrate shown in FIG. 21.
Figure 23:
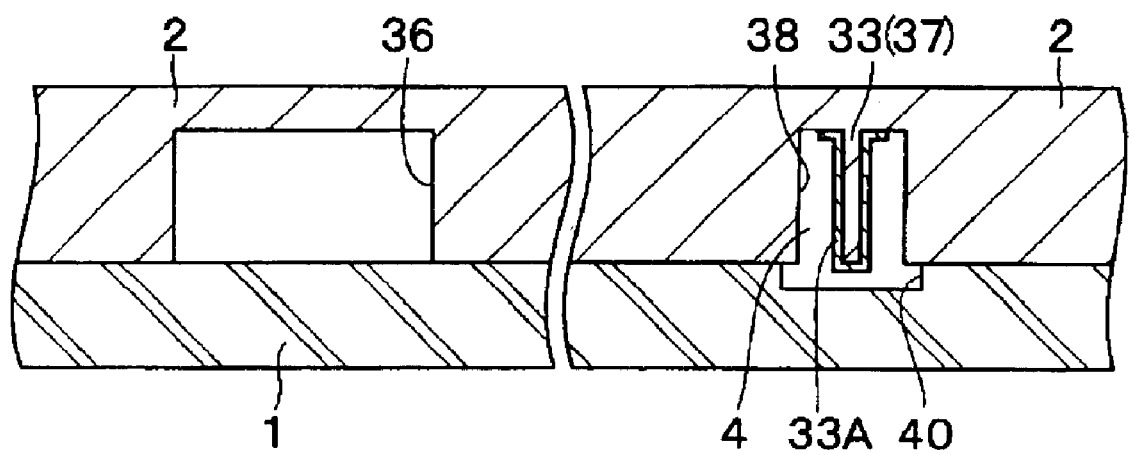
FIG. 23 is a sectional view showing a state that the surface of the silicon substrate shown in FIG. 22 is polished.

Next, as shown in FIG. 22, on the bottom surface of the silicon substrate 2', the glass substrate 1 is bonded by anode coupling. At this time, on the surface of the glass substrate 1, shallow grooves 40 are formed at positions, on which the central intersection 4, the actuator 6, and so forth are faced, so as to prevent the mirror 33, etc. from being brought into contact with the glass substrate 1 by the shallow grooves 40. Then, in this state, as shown in FIG. 23, the surface of the silicon substrate 2' is polished so as to form the thin-thickness silicon substrate 2.

Figure 24:
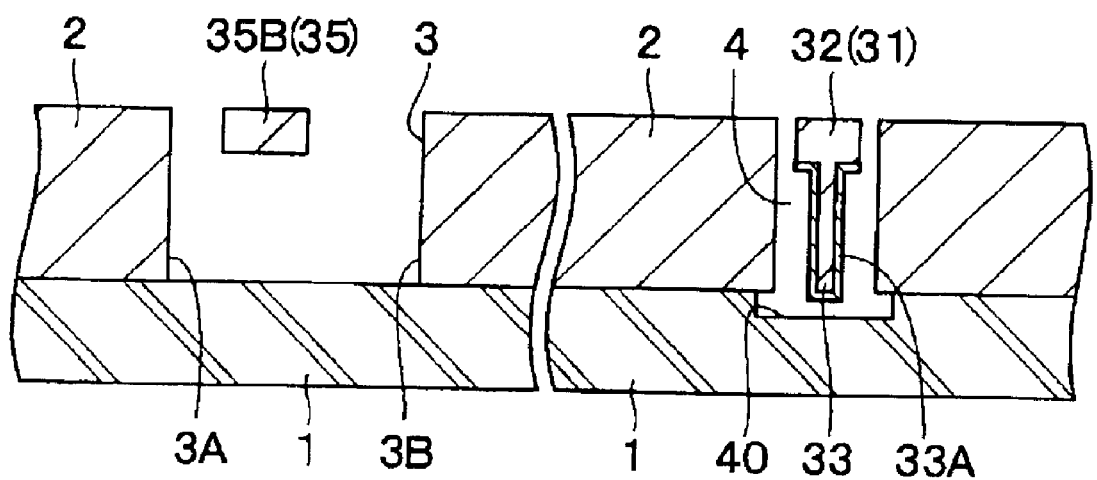
FIG. 24 is a sectional view showing a state that reactive ion etching is performed from the surface of the silicon substrate shown in FIG. 23 so as to form the fiber clamp, the mirror, and so forth.

Then, as shown in FIG. 24, on the portions corresponding to the preliminary fiber-mounting grooves 36 and the preliminary concave groove 38, the reactive ion etching is performed from the surface of the silicon substrate 2 so as to penetrate the silicon substrate 2. Thereby, the actuator 31 including the arm 32 and the mirror 33 is formed while the fiber-mounting grooves 3 and the fiber clamp 35 are formed together.

At this time, since on the silicon substrate 2, the mirror 33 has been already formed in addition to the preliminary fiber-mounting grooves 36 and the preliminary concave groove 38 formed in advance, the reactive ion etching may be performed only on the residual length in thickness of the silicon substrate 2, so that the etching is completed in a short time in comparison with the case where the etching is performed on the entire thickness. Also, since the thickness of the fiber clamp 35 is preferably substantially the same as that of the arm 32 of the actuator 31, the fiber clamp 35 can be formed together with the arm 32.

Figure 25:
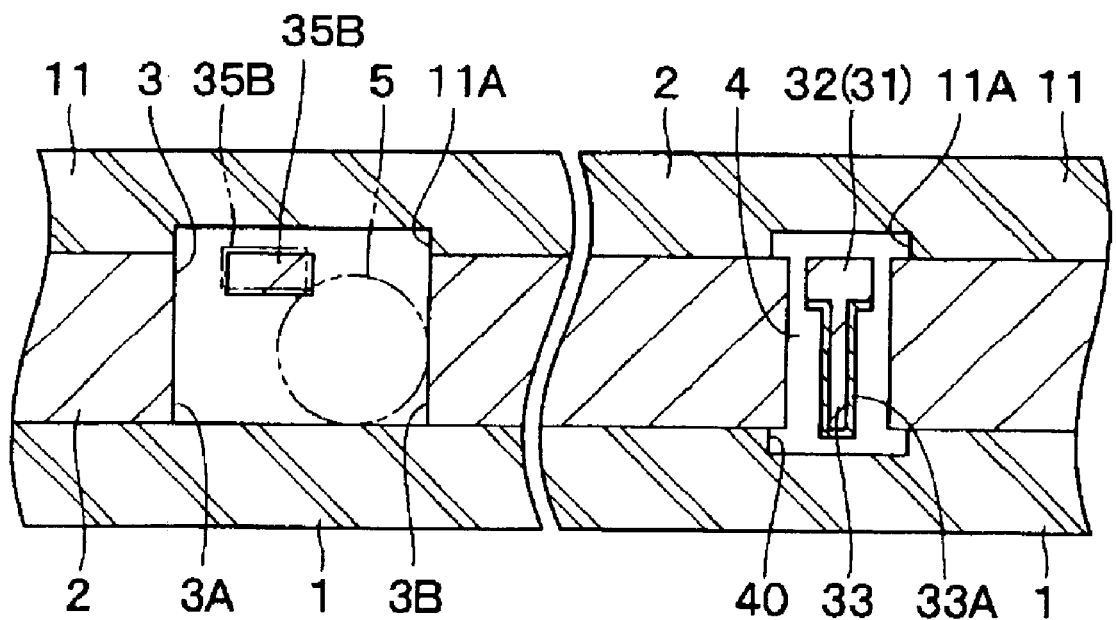
FIG. 25 is a sectional view showing a state that the glass substrate for covering is bonded on the surface of the silicon substrate shown in FIG. 24.

Finally, as shown in FIG. 25, on the surface of the silicon substrate 2, the glass substrate 11 having the shallow grooves 11A formed thereon in advance is bonded as a cover substrate. Then, after the optical fibers 5 are inserted into the fiber-mounting grooves 3 from the external periphery of the silicon substrate 2, the optical fibers 5 are fixed with an adhesive or other suitable material or elements, so as to complete the optical switch device.

The optical switch device according to the present preferred embodiment is manufactured by the method described above, and now switching operation thereof will be described.

First, if a voltage is not applied between the movable interdigital electrode 34B and the fixed interdigital electrode 34C of the actuator 31, owing to an elastic force of the support beam 34A, the mirror 33 enters the central intersection 4 to be located there (the middle position of the optical paths O1 and O2). Therefore, light emitted from one pair of two optical fibers 5 each, which are arranged along the optical paths O1 and O2, respectively, is reflected on the mirror 33 so as to enter the other pair of two optical fibers 5 each, which are arranged along the perpendicular optical paths O2 and O1, respectively, so that optical communications are performed therebetween.

On the other hand, if a voltage with reverse polarity (positive and negative) is applied between the movable interdigital electrode 34B and the fixed interdigital electrode 34C of one driving unit 34 of the actuator 31 while a voltage with the same polarity (positive, for example) is applied between the movable interdigital electrode 34B and the fixed interdigital electrode 34C of the other driving unit 34, an electrostatic attracting force is produced between one pair of the electrodes 34B and 34C while an electrostatic repulsive force is produced between the other pair of the electrodes 34B and 34C, so that the mirror 33 is retracted from the central intersection 4 against the elastic force of the support beam 34A. Therefore, light emitted from one pair of two optical fibers 5 each, which are arranged along the optical paths O1 and O2, respectively, is entered into the other pair of two optical fibers 5 each, which are arranged along the optical paths O1 and O2, respectively, so that optical communications are performed therebetween. As a result, based on the presence of the voltage applied between the electrodes 34B and 34C, the optical paths O1 and O2 can be switched and connected.

In such a manner, according to the present preferred embodiment having the structure described above, substantially the same advantages as those of the first preferred embodiment described above can also be obtained. Whereas according to the present preferred embodiment, since the mirror 33 is provided, which is arranged at the middle of the arm 32 in the longitudinal direction and sagging toward the glass substrate 1, the driving units 34 can be arranged at two opposite ends of the arm 32.

Figure 26:
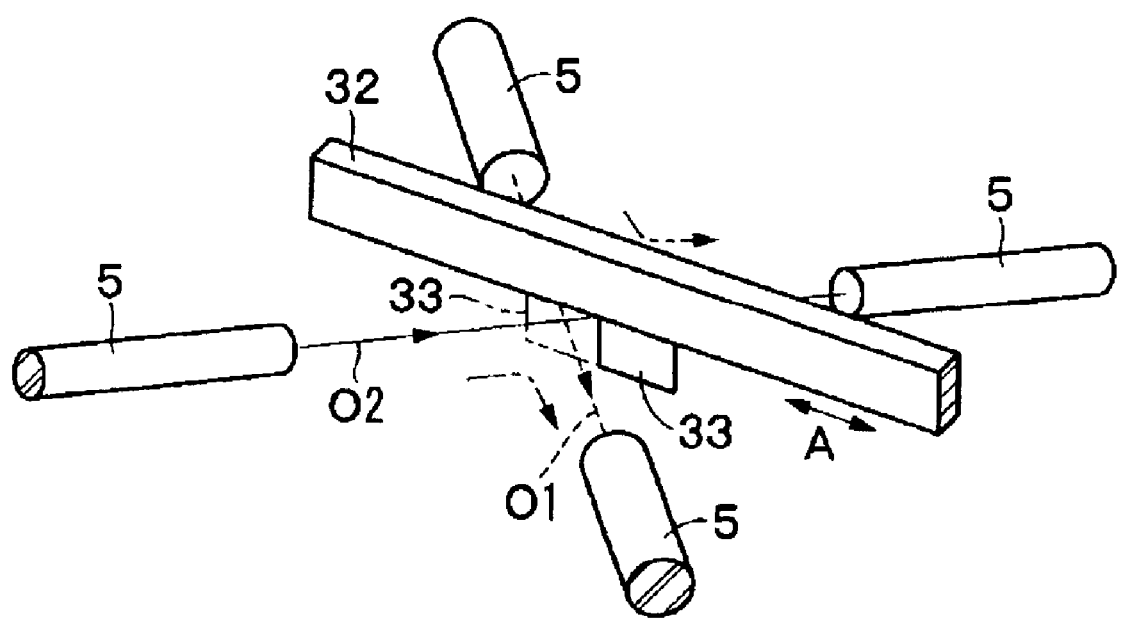
FIG. 26 is a perspective view showing a positional relationship between an arm, a mirror, and an optical fiber according to the third preferred embodiment of the present invention.
Figure 27:
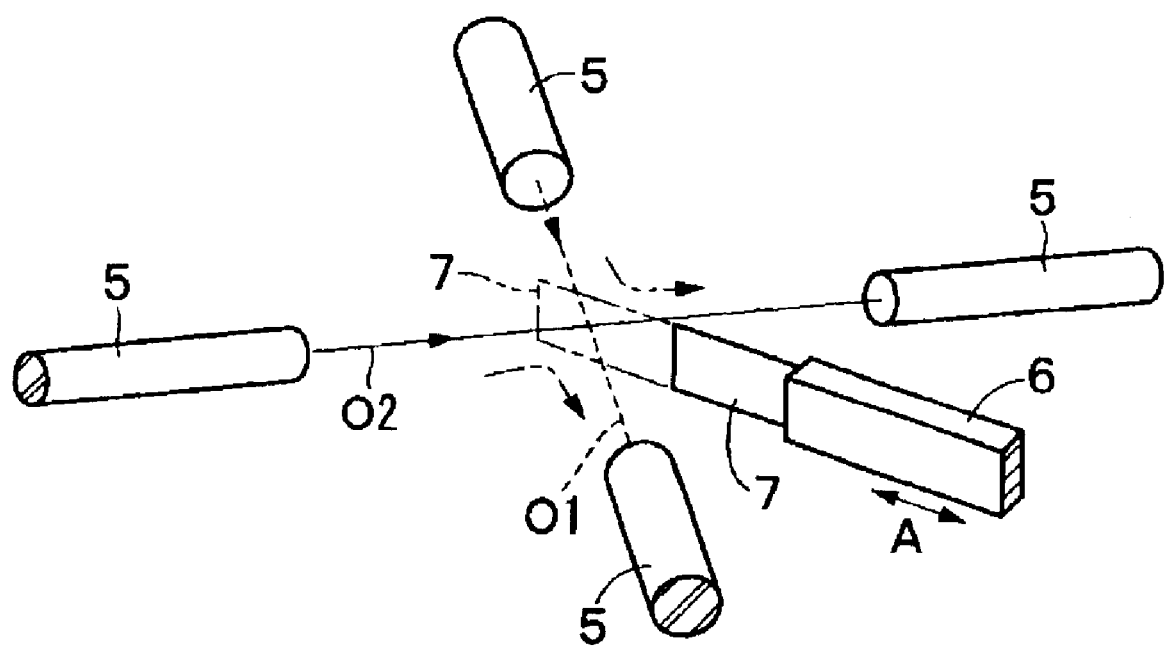
FIG. 27 is a perspective view showing a positional relationship between an arm, a mirror, and an optical fiber of a comparative example.

That is, as shown in FIG. 26, according to the present preferred embodiment, since the mirror 33 is arranged in the arm 32 to sag down therefrom, the arm 32 cannot shield the optical paths O1 and O2. Whereas, as in a comparative example (first preferred embodiment) shown in FIG. 27, if the mirror 8 is provided along the entire thickness of the arm 7, and the arm 7 is extended beyond the mirror 8, the arm 7 shields the optical paths O1 and O2. Accordingly, if the mirror 8 is provided along the entire thickness of the arm 7, it is necessary to provide the mirror 8 at the end extremity of the arm 7 with a cantilevered suspension, so that the driving unit can be provided only in one location that is the rear anchor of the arm 7.

Whereas, according to the present preferred embodiment, the driving units 34 can be provided in two locations at opposite ends of the arm 32, so that the driving voltage for the actuator 31 can be reduced, enabling the operability to be improved while the silicon substrate 2 being efficiently utilized without waste.

Also, since the fiber clamp 35 is constructed on the surface of the silicon substrate 2 together with the arm 32 of the actuator 31, a machining time for the reactive ion etching or the like, which needs a long period of time, can be reduced in comparison with the case where the actuator 31 is constructed separately from the fiber clamp 35.

Furthermore, if the reactive ion etching is performed on the entire thickness of the silicon substrate 2, the silicon substrate 2 tends to be dislocated in the thickness direction thereof, so that strain is liable to be produced on a mirror-finished plane of the mirror 33. Whereas, according to the present preferred embodiment, the mirror 33 is constructed on the silicon substrate 2 to sag down therefrom by performing the reactive ion etching on the silicon substrate 2 until the middle position of the thickness thereof, so that the strain is difficult to be produced in the mirror 33, enabling accuracies in switching of the optical paths O1 and O2 as well as reliability to be improved.

According to the third preferred embodiment, the silicon substrate 2' with a thickness larger than that of the silicon substrate 2 is prepared in advance, the etching is performed on the bottom surface of the silicon substrate 2', then, the surface of the silicon substrate 2' is polished after the glass substrate 1 is bonded so as to form the silicon substrate 2 with a predetermined thickness. In this case, although a process for polishing the silicon substrate 2' is required, during the handling in manufacturing, the silicon substrate 2' can be prevented from producing chippings and cracks, enabling the yield to be improved.

However, the present invention is not limited to these methods, and according to the third preferred embodiment, instead of the silicon substrate 2', a thin silicon substrate 2 that is thin from the process beginning may be used. The polishing process of the silicon substrate 2' can be thereby omitted. On the other hand, according to the first and second preferred embodiments, the thin silicon substrate 2 that is thin from the process beginning is used, alternatively, in the same way as in the third preferred embodiment, a silicon substrate 2' that is thick in the process beginning may be used so as to form a thin silicon substrate 2 by polishing the silicon substrate 2' after bonding to the glass substrate 1.

Also, according to the third preferred embodiment, in the two driving units 34, two pairs of the movable interdigital electrode 34B and the fixed interdigital electrode 34C each are arranged at positions opposite to each other (positions symmetrical with each other), so that an electrostatic attracting force is produced in one driving unit 34 while an electrostatic repulsive force is produced in the other driving unit 34. However, the present invention is not limited to this arrangement, and as in modifications shown in FIGS. 28 and 29, in the two driving units 34', two pairs of the movable interdigital electrode 34B' and the fixed interdigital electrode 34C' each may be arranged at positions equal to each other (positions displaced substantially parallel to each other), so that electrostatic attracting forces may be produced in both driving units 34'.

Also, according to the third preferred embodiment, the four fiber-mounting grooves 3 are preferably crosswise arranged. Alternatively, as in the modifications shown in FIGS. 28 and 29, four fiber-mounting grooves 3' may be arranged substantially in parallel, two grooves each, so that two optical paths O1 and O2 are arranged substantially parallel to each other. In this case, an arm 32' is provided with two substantially triangular-shaped mirrors 33' formed separately from each other so as to arrange them so that two apexes thereof face each other.

Figure 28:
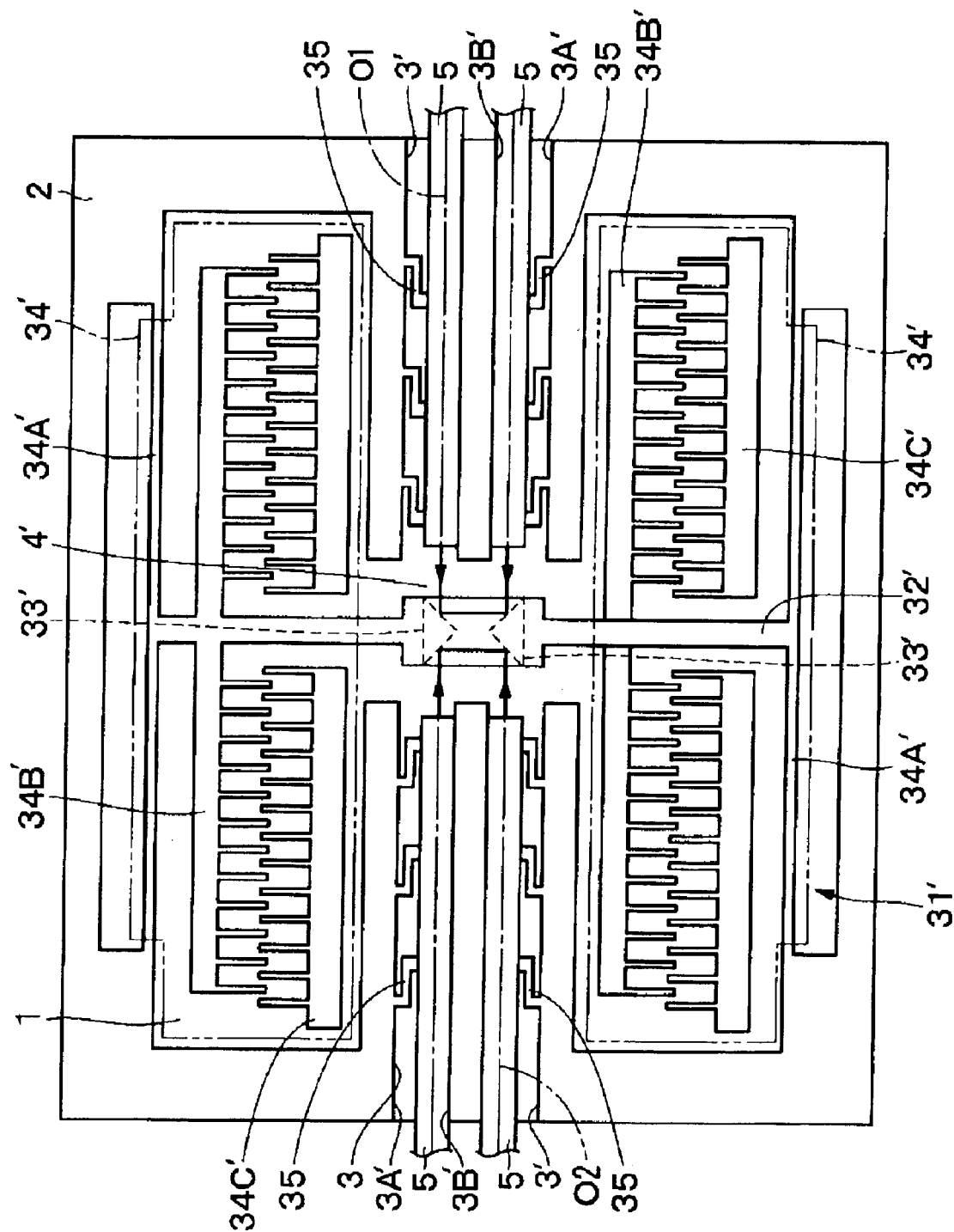
FIG. 28 is a plan view of an optical switch device of a modified example of the present invention shown in a state that a glass substrate for covering is removed.
Figure 29:
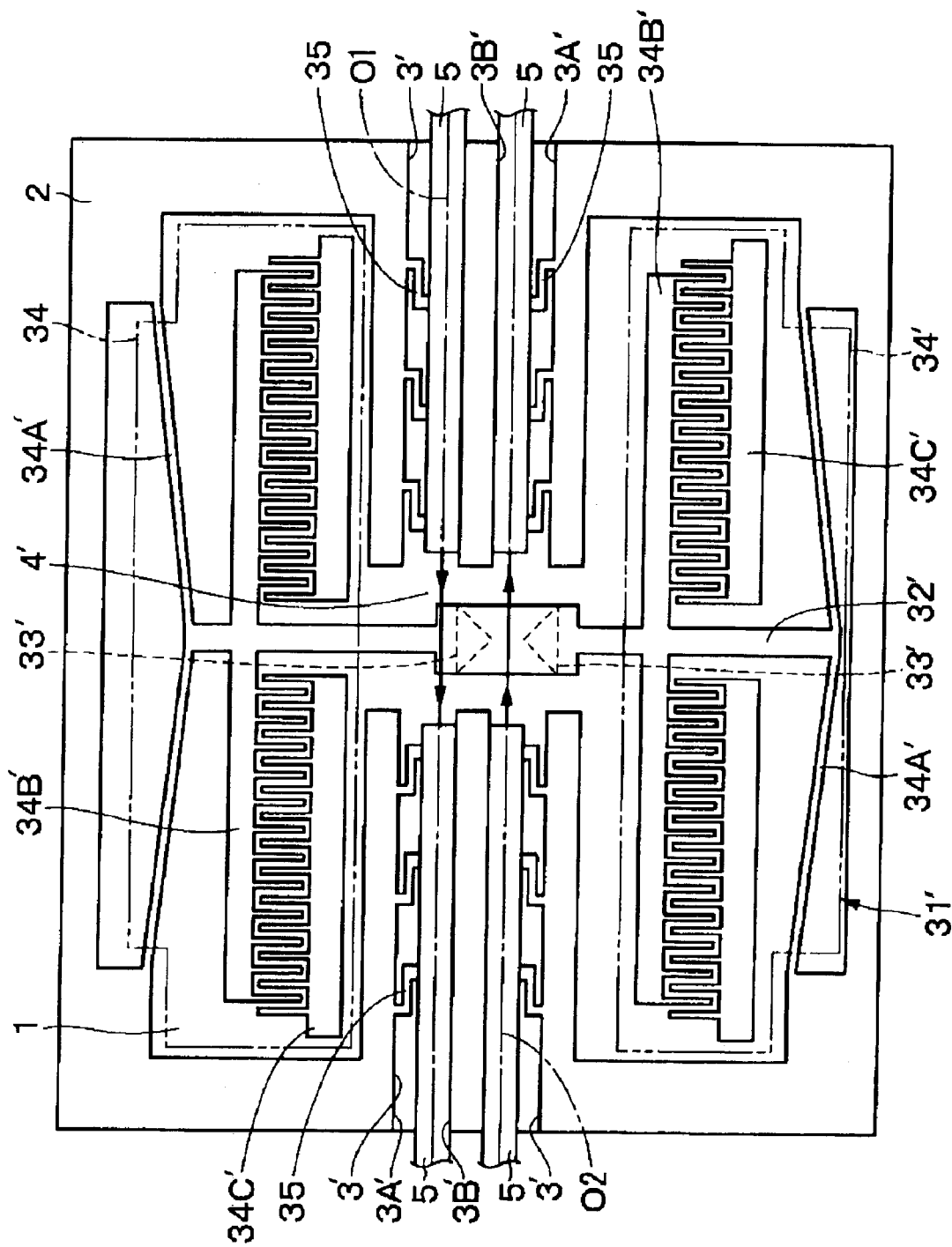
FIG. 29 is a plan view showing a state that the optical switch device shown in FIG. 28 is driven by a driving unit.

Thereby, in the state that the driving units 34' are stopped as shown in FIG. 28, light emitted from the optical fibers 5 is reflected by the two mirrors 33' in opposite directions so that the two optical fibers 5 in the left side viewed in FIG. 28 are connected together while the two optical fibers 5 in the right side are connected together. On the other hand, in the state that the driving units 34' are driven as shown in FIG. 29, since the mirrors 33' are removed, light emitted from the optical fibers 5 proceeds straight without impinging on the mirrors 33' so that the two optical fibers 5 in the upper portion viewed in FIG. 29 are connected together while the two optical fibers 5 in the lower portion are connected together.

According to the preferred embodiments described above, as the driving units 9 and 34, the interdigital electrodes 9B, 9C, 34B, and 34C are preferably used. However, the present invention is not limited to this, and a parallel plate electrode may be used, for example, so as to form a driving unit.

Furthermore, according to the preferred embodiments described above, as the first substrate, the glass substrate 1 is preferably used. Alternatively, a silicon substrate may be used as the first substrate.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. An optical switch device comprising:
   a first substrate;
   a second substrate arranged to abut the first substrate and having a plurality of fiber-mounting grooves formed thereon adjacent to the first substrate;
   a plurality of optical fibers arranged in each of the plurality of fiber-mounting grooves of the second substrate and opposing each other at an interval; and
   an actuator for switching an optical path between the optical fibers by proceeding to and retracting from between the plurality of optical fibers arranged on the second substrate; wherein
   the second substrate includes a fiber clamp arranged to push the optical fiber toward one of two opposite internal surfaces of the fiber-mounting groove and toward the first substrate;
   the fiber clamp comprises a spring unit having a rear anchor attached to one internal surface of the fiber-mounting groove and an end extremity movable in width directions of the fiber-mounting groove, and a pushing unit arranged adjacent to the end extremity of the spring unit for obliquely pushing the optical fiber toward the other internal surface and toward the first substrate; and
   the pushing unit includes an inclined plans formed thereon that is inclined in a thickness direction of the second substrate so as to be brought into surface contact with the optical fiber.

2. A device according to claim 1, further comprising a third substrate disposed on said second substrate, wherein the actuator includes an arm and a mirror that are unitary with one another.

3. A device according to claim 2, wherein the third substrate is made of glass.

4. A device according to claim 1, wherein the actuator comprises an arm disposed adjacent to the surface of the second substrate and extending between the plurality of optical fibers, a mirror disposed in the middle of the arm in the longitudinal direction and extending toward the first substrate, and two driving units disposed adjacent to opposite ends of the arm for displacing the arm in the longitudinal direction thereof so as to drive the mirror to proceed to and retract from the middle of the optical path, and wherein the fiber clamp is constructed together with the arm of the actuator so as to position the fiber clamp adjacent to the surface of the second substrate.

5. A device according to claim 1, wherein the actuator includes an arm disposed on the surface of the second substrate and extending over between the plurality of optical fibers, a mirror disposed in the middle of the arm in the longitudinal direction and extending toward the first substrate, and two driving units disposed on both ends of the arm for driving the mirror to proceed to and retract from the middle of the optical path, and the actuator is arranged to position the fiber clamp on the surface of the second substrate.

6. A device according to claim 1, wherein the first substrate is one of a glass substrate and a silicon substrate.

7. A device according to claim 1, wherein the first substrate has a substantially rectangular plate shaped configuration.

8. A device according to claim 1, wherein the second substrate is a silicon substrate.

9. A device according to claim 1, wherein the second substrate has a substantially rectangular plate-shape configuration and is substantially the same size as that of the first substrate.

10. A device according to claim 1, wherein the plurality of fiber-mounting grooves comprises four fiber-mounting grooves which are radially arranged at about 90° apart from each other.

11. A device according to claim 10, wherein two of the four fiber-mounting grooves are linearly arranged along two optical paths intersecting with each other, and another two of the four fiber-mounting grooves are arranged to sandwich a central intersection of the two optical paths.

12. A device according to claim 10, wherein the fiber-mounting grooves separate the second substrate into four substantially triangular islands.

13. A device according to claim 1, wherein the actuator includes an arm linearly extending from a central intersection of two optical paths intersecting with each other, a mirror disposed at an end extremity of the arm and arranged to enter into and withdraw from the central intersection of the two optical paths, and a driving unit disposed at a rear anchor of the arm for displacing the arm in a longitudinal direction of the arm.

14. A device according to claim 13, wherein the driving unit includes a support beam linearly extending from both sides of the arm in directions that are substantially perpendicular to the longitudinal direction of the arm for supporting the arm in a movable manner, a movable interdigital electrode disposed in the rear anchor of the arm and moving together with the arm, and a fixed interdigital electrode fixed to the first substrate so as to mesh with the movable interdigital electrode.

15. A device according to claim 1, wherein a glass substrate is provided on the surface of the second substrate to define a cover substrate and has substantially the same shape as that of the first substrate.

16. A device according to claim 15, wherein grooves are formed on a surface of the glass substrate provided on the surface of the second substrate.

17. A device according to claim 1, wherein the fiber clamp is located closer to the surface of the second substrate than an axial center of one of the optical fibers inserted into one of the fiber-mounting grooves.

18. An optical switch device comprising:

a first substrate;

a second substrate arranged to abut the first substrate and having a plurality of fiber-mounting grooves formed thereon adjacent to the first substrate;

a plurality of optical fibers arranged in each of the plurality of fiber-mounting grooves of the second substrate and opposing each other at an interval; and an actuator for switching an optical oath between the optical fibers by proceeding to and retracting from between the plurality of optical fibers arranged on the second substrate; wherein the second substrate includes a fiber clamp arranged to push the optical fiber toward one of two opposite internal surfaces of the fiber-mounting groove and toward the first substrate;

the fiber clamp includes a spring unit having a rear anchor attached to one internal surface of one of the fiber-mounting grooves and extending along the one of the fiber-mounting grooves as a cantilever and a pushing unit arranged adjacent to an and extremity of the spring unit so as to produce toward another internal surface of the one of the fiber-mounting grooves; and the pushing unit has a substantially rectangular shape and protrudes from the end extremity of the spring unit and corners of the pushing unit are chamfered.

19. A device according to claim 18, wherein the actuator comprises an arm disposed adjacent to the surface of the second substrate and extending between the plurality of optical fibers, a mirror disposed in the middle of the arm in the longitudinal direction and extending toward the first substrate, and two driving units disposed adjacent to opposite ends of the arm for displacing the arm in the longitudinal direction thereof so as to drive the mirror to proceed to and retract from the middle of the optical path, and wherein the fiber clamp is constructed together with the arm of the actuator so as to position the fiber clamp adjacent to the surface of the second substrate.

20. A device according to claim 18, further comprising a third substrate disposed on said second substrate, wherein the actuator includes an arm and a mirror that are unitary with one another.

21. A device according to claim 20, wherein the third substrate is made of glass.

22. A device according to claim 18, wherein the first substrate is one of a glass substrate and a silicon substrate.

23. A device according to claim 18, wherein the first substrate has a substantially rectangular plate shaped configuration.

24. A device according to claim 18, wherein the second substrate is a silicon substrate.

25. A device according to claim 18, wherein the second substrate has a substantially rectangular plate-shape configuration and is substantially the same size as that of the first substrate.

26. A device according to claim 18, wherein the plurality of fiber-mounting grooves comprises four fiber-mounting grooves which are radially arranged at about 90° apart from each other.

27. A device according to claim 26, wherein two of the four fiber-mounting grooves are linearly arranged along two optical paths intersecting with each other, and another two of the four fiber-mounting grooves are arranged to sandwich a central intersection of the two optical paths.

28. A device according to claim 26, wherein the fiber-mounting grooves separate the second substrate into four substantially triangular islands.

29. A device according to claim 18, wherein the actuator includes an arm linearly extending from a central intersection of two optical paths intersecting with each other, a mirror disposed at an end extremity of the arm and arranged to enter into and withdraw from the central intersection of the two optical paths, and a driving unit disposed at a rear anchor of the arm for displacing the arm in a longitudinal direction of the arm.

30. A device according to claim 29, wherein the driving unit includes a support beam linearly extending from both sides of the arm in directions that are substantially perpendicular to the longitudinal direction of the arm for supporting the arm in a movable manner, a movable interdigital electrode disposed in the rear anchor of the arm and moving together with the arm, and a fixed interdigital electrode fixed to the first substrate so as to mesh with the movable interdigital electrode.

31. A device according to claim 18, wherein the fiber clamp is located closer to the surface of the second substrate than an axial center of one of the optical fibers inserted into one of the fiber-mounting grooves.

32. A device according to claim 18, wherein a glass substrate is provided on the surface of the second substrate to define a cover substrate and has substantially the same shape as that of the first substrate.

33. A device according to claim 32, wherein grooves are formed on a surface of the glass substrate provided on the surface of the second substrate.

34. A device according to claim 18, wherein the actuator includes an arm disposed on the surface of the second substrate and extending over between the plurality of optical fibers, a mirror disposed in the middle of the arm in the longitudinal direction and extending toward the first substrate, and two driving units disposed on both ends of the arm for driving the mirror to proceed to and retract from the middle of the optical path, and the actuator is arranged to position the fiber clamp on the surface of the second substrate.

35. An optical switch device comprising:
a first substrate;
a second substrate arranged to abut the first substrate and having a plurality of fiber-mounting grooves formed thereon adjacent to the first substrate;
a plurality of optical fibers arranged in each of the plurality of fiber-mounting grooves of the second substrate and opposing each other at an interval; and
an actuator for switching an optical path between the optical fibers by proceeding to and retracting from between the plurality of optical fibers arranged on the second substrate; wherein
the second substrate includes a fiber clamp arranged to push the optical fiber toward one of two opposite internal surfaces of the fiber-mounting groove and toward the first substrate;
the fiber clamp includes a spring unit having a rear anchor attached to one internal surface of one of the fiber-mounting grooves and extending along the one of the fiber-mounting grooves as a cantilever and a pushing unit arranged adjacent to an end extremity of the spring unit so as to protrude toward another internal surface of the one of the fiber-mounting grooves; and
the pushing unit of the fiber clamp is obliquely inclined in the thickness direction of the second substrate and has an inclined plane surface-contacting on one of the optical fibers.

36. A device according to claim 35, wherein tile first substrate is one of a glass substrate and a silicon substrate.

37. A device according to claim 35, wherein the first substrate has a substantially rectangular plate shaped configuration.

38. A device according to claim 35, wherein the second substrate is a silicon substrate.

39. A device according to claim 35, wherein the second substrate has a substantially rectangular plate-shape configuration and is substantially the same size as that of the first substrate.

40. A device according to claim 35, wherein the plurality of fiber-mounting grooves comprises four fiber-mounting grooves which are radially arranged at about 90° apart from each other.

41. A device according to claim 40, wherein two of the four fiber-mounting grooves are linearly arranged along two optical paths intersecting with each other, and another two of the four fiber-mounting grooves are arranged to sandwich a central intersection of the two optical paths.

42. A device according to claim 40, wherein the fiber-mounting grooves separate the second substrate into four substantially triangular islands.

43. A device according to claim 35, wherein the actuator includes an arm linearly extending from a central intersection of two optical paths intersecting with each other, a mirror disposed at an end extremity of the arm and arranged to enter into and withdraw from the central intersection of the two optical paths, and a driving unit disposed at a rear anchor of the arm for displacing the arm in a longitudinal direction of the arm.

44. A device according to claim 43, wherein the driving unit includes a support beam linearly extending from both sides of the arm in directions that are substantially perpendicular to the longitudinal direction of the arm for supporting the arm in a movable manner, a movable interdigital electrode disposed in the rear anchor of the arm and moving together with the arm, and a fixed interdigital electrode fixed to the first substrate so as to mesh with the movable interdigital electrode.

45. A device according to claim 35, wherein the fiber clamp is located closer to the surface of the second substrate than an axial center of one of the optical fibers inserted into one of the fiber-mounting grooves.

46. A device according to claim 35, wherein a glass substrate is provided on the surface of the second substrate to define a cover substrate and has substantially the same shape as that of the first substrate.

47. A device according to claim 46, wherein grooves are formed on a surface of the glass substrate provided on the surface of the second substrate.

48. A device according to claim 35, wherein the actuator includes an arm disposed on the surface of the second substrate and extending over between the plurality of optical fibers, a mirror disposed in the middle of the arm in the longitudinal direction and extending toward the first substrate, and two driving units disposed on both ends of the arm far driving the mirror to proceed to and retract from the middle of the optical path, and the actuator is arranged to position the fiber clamp on the surface of the second substrate.

49. A device according to claim 35, wherein the actuator comprises an arm disposed adjacent to the surface of the second substrate and extending between the plurality of optical fibers, a mirror disposed in the middle of the arm in the longitudinal direction and extending toward the first substrate, and two driving units disposed adjacent to opposite ends of the arm for displacing the arm in the longitudinal direction thereof so as to drive the mirror to proceed to and retract from the middle of the optical path, and wherein the fiber clamp is constructed together with the arm of the actuator so as to position the fiber clamp adjacent to the surface of the second substrate.

50. A device according to claim 35, further comprising a third substrate disposed on said second substrate, wherein the actuator includes an arm and a mirror that are unitary with one another.

51. A device according to claim 50, wherein the third substrate is made of glass.

* * * * *